United States Patent
Kiczenski et al.

(10) Patent No.: US 11,492,286 B2
(45) Date of Patent: Nov. 8, 2022

(54) COLORED GLASSES WITH IMPROVED TEMPERING CAPABILITIES

(71) Applicant: CORNING INCORPORATED, Corning, NY (US)

(72) Inventors: Timothy James Kiczenski, Corning, NY (US); Peter Joseph Lezzi, Corning, NY (US); Michelle Diane Pierson-Stull, Painted Post, NY (US); Jingshi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 153 days.

(21) Appl. No.: 16/767,170

(22) PCT Filed: Nov. 30, 2018

(86) PCT No.: PCT/US2018/063399
§ 371 (c)(1),
(2) Date: May 27, 2020

(87) PCT Pub. No.: WO2019/108989
PCT Pub. Date: Jun. 6, 2019

(65) Prior Publication Data
US 2020/0385303 A1    Dec. 10, 2020

Related U.S. Application Data

(60) Provisional application No. 62/592,693, filed on Nov. 30, 2017.

(51) Int. Cl.
C03C 3/091    (2006.01)
C03C 3/095    (2006.01)
(Continued)

(52) U.S. Cl.
CPC ............... C03C 4/02 (2013.01); C03C 3/087 (2013.01); C03C 3/091 (2013.01); C03C 3/095 (2013.01);
(Continued)

(58) Field of Classification Search
CPC ............ C03C 3/087; C03C 3/091; C03C 4/02
See application file for complete search history.

(56) References Cited

U.S. PATENT DOCUMENTS 3,753,674 A    8/1973 Ohlberg et al.
7,867,932 B2   1/2011 Beall
(Continued)

FOREIGN PATENT DOCUMENTS

EP    0413254 A1    2/1991
TW    201920028 A   6/2019

OTHER PUBLICATIONS

Barsom, John M., "Fracture of Tempered Glass", J. Am. Ceram. Soc., vol. 51, No. 2, Feb. 1968, pp. 75-78.
(Continued)

*Primary Examiner* — Karl E Group
(74) *Attorney, Agent, or Firm* — Russell S. Magaziner

(57) ABSTRACT

The disclosure relates to highly temperable colored glass compositions. The colored glass compositions have high coefficients of thermal expansion and high Young's moduli that advantageously absorb in the ultraviolet and/or blue wavelength ranges. Methods of making such glasses are also provided.

6 Claims, 3 Drawing Sheets

(51) Int. Cl.
    C03C 4/02       (2006.01)
    C03C 3/087      (2006.01)
(52) U.S. Cl.
    CPC .. *C03C 2201/3423* (2013.01); *C03C 2201/36* (2013.01); *C03C 2201/50* (2013.01)

(56) References Cited

U.S. PATENT DOCUMENTS

| | | | |
|---|---|---|---|
| 9,963,378 B2* | 5/2018 | Yamamoto | C03C 4/16 |
| 2001/0011057 A1* | 8/2001 | Seto | C03C 4/082 |
| | | | 501/70 |
| 2004/0063564 A1 | 4/2004 | Kawai et al. | |
| 2009/0069163 A1 | 3/2009 | Beall | |
| 2013/0233386 A1 | 9/2013 | Hanawa et al. | |
| 2014/0242391 A1 | 8/2014 | Ono et al. | |
| 2015/0166400 A1* | 6/2015 | Yamamoto | C03C 3/087 |
| | | | 428/410 |
| 2015/0166401 A1* | 6/2015 | Yamamoto | C03C 4/16 |
| | | | 501/71 |
| 2015/0166403 A1* | 6/2015 | Yamamoto | C03C 3/087 |
| | | | 501/71 |

OTHER PUBLICATIONS

Gardon, Robert, "Chapter 5—Thermal Tempering of Glass", Glass Science and Technology, vol. 5, 1980, pp. 145-216.
International Search Report and Written Opinion of the International Searching Authority; PCT/US2018/063399; dated May 8, 2019; 17 Pages; European Patent Office.
Morey, George W., "The Effect of Boric Oxide On the Devitrification of the Soda-Lime-Silica Glasses. The Quaternary System, $Na_2O$—$CaO$—$B_2O_3$—$SiO_2$1", J. Am. Ceram. Soc., vol. 15, No. 9, Sep. 1932, pp. 457-475.
Narayanaswamy, O.S., "Stress and Structural Relaxation in Tempering Glass", J. Am. Ceram. Soc., vol. 61, No. 3-4, Mar. 1978, pp. 146-152.
Ohlberg et al., "Thermal Stress Calculations Based On A Linear Viscoelastic Deviatoric Response And A Fictive Temperature Component For The Volumetric Response", Journal of Non-Crystalline Solids, vol. 14, No. 1, 1974, pp. 280-286.
S. T. Gulati, "Frangibility of Tempered Soda-Lime Glass Sheet," pp. 13-15 in Glass Performance Days, 1997.
S. Timoshenko and J.N. Goodier, Theory of Elasticity, 2nd ed; p. 146. McGraw-Hill Book Co., New York, 1951.
Taiwanese Patent Application No. 107142919, Office Action, dated Mar. 9, 2022, 1 page; Taiwanese Patent Office.

* cited by examiner

COLORED GLASSES WITH IMPROVED TEMPERING CAPABILITIES

FIELD OF DISCLOSURE

This application claims the benefit of priority under 35 U.S.C. § 371 of International Application No. PCT/US18/63399, filed on Nov. 30, 2018, which claims the benefit of priority under 35 U.S.C. § 119 of U.S. Provisional Application Serial No. 62/592,693 filed on Nov. 30, 2017, the content of which is relied upon and incorporated herein by reference in its entirety.

The disclosure relates to highly temperable colored glass compositions. More particularly, the disclosure relates to glasses having improved tempering when compared to common soda lime glasses. Even more particularly, the disclosure relates to colored glass compositions with high coefficients of thermal expansion and high Young's moduli that advantageously absorb in the ultraviolet and/or blue wavelength ranges.

BACKGROUND

Thermally-tempered glass, sometimes called safety glass, is often applied in situations where safe fracture behavior is required to prevent injury in the case of failure. For example, safety glass is used to strengthen automobile side and rear windows, as well as objects such as shower doors. The property of tempered glass that makes it so desirable in safety applications is that when it breaks, it shatters into rock salt-like, cubicle pieces which do not have sharp edges or needle-like points. This desired fracture behavior is called "dicing" and occurs when the glass has achieved full temper.

In addition to the safety aspect of thermally tempered glass, tempering strengthens the glass, making it more damage resistant and durable. Because of the increased durability, tempered glass can be used in applications where normal glass would quickly break—for example, automotive windshields, where the glass may be impacted by rocks or other hard materials. Due to the increase in glass use in architectural, automotive, and electronic device applications, there is a continuing unmet need for safe, strengthened glasses having improved tempering capabilities.

SUMMARY

In an aspect (1), the disclosure provides a glass composition comprising 55-75 mol % $SiO_2$, greater than 0 mol % $Al_2O_3$, greater than 0 to 20 mol % of at least one alkaline earth oxide from the group consisting of MgO, CaO, BaO, or SrO, 6-16 mol % $Na_2O+K_2O$, 0-16 mol % $Na_2O$, 0-16 mol % $K_2O$, >0-4 mol % $TiO_2$ and one or more of $B_2O_3$ or ZnO, wherein $B_2O_3$, when present, comprises >0-12 mol % and ZnO, when present, comprises >0-8 mol %. In an aspect (2), the disclosure provides the glass composition of aspect (1) comprising 60-75 mol % $SiO_2$. In an aspect (3), the disclosure provides the glass composition of aspect (1) or aspect (2), further comprising 0-0.2 mol % $Fe_2O_3$. In an aspect (4), the disclosure provides the glass composition of aspect (3), comprising 0-0.1 mol % $Fe_2O_3$. In an aspect (5), the disclosure provides the glass composition of aspect (1) or aspect (2), wherein the glass composition is free of iron. In an aspect (6), the disclosure provides the glass composition of any of aspects (1)-(5), further comprising >0-2 mol % oxides of cerium, holmium, copper, nickel or combinations thereof. In an aspect (7), the disclosure provides the glass composition of aspect (6), comprising >0-1 mol % cerium oxides. In an aspect (8), the disclosure provides the glass composition of aspect (6), comprising >0-1 mol % copper oxides. In an aspect (9), the disclosure provides the glass composition of any of aspects (1)-(8), comprising >0-10 mol % MgO.

In an aspect (10), the disclosure provides the glass composition of any of aspects (1)-(9), comprising >0-12 mol % $Al_2O_3$. In an aspect (11), the disclosure provides the glass composition of any of aspects (1)-(10), comprising >0-15 mol % CaO. In an aspect (12), the disclosure provides the glass composition of any of aspects (1)-(11), comprising 8-16 mol % $Na_2O+K_2O$. In an aspect (13), the disclosure provides the glass composition of any of aspects (1)-(12), comprising >0-15 mol % $Na_2O$. In an aspect (14), the disclosure provides the glass composition of any of aspects (1)-(13), comprising 1-12 or 1.5-10 mol % $B_2O_3$ and is optionally free of ZnO. In an aspect (15), the disclosure provides the glass composition of any of aspects (1)-(14), comprising 3-8 mol % ZnO and is optionally free of $B_2O_3$. In an aspect (16), the disclosure provides the glass composition of any of aspects (1)-(15), wherein the glass composition has a low temperature coefficient of thermal expansion (LTCTE) measured from 25° C. to 300° C. and a high temperature coefficient of thermal expansion (HTCTE) measured at temperature above glass transition region, and wherein the sum of the LTCTE and the HTCTE is $350 \times 10^{-7}$/° C. or greater. In an aspect (17), the disclosure provides the glass composition of aspect (16), wherein the sum of the LTCTE and the HTCTE is $370 \times 10^{-7}$/° C. or greater. In an aspect (17), the disclosure provides the glass composition of aspect (16), wherein the sum of the LTCTE and the HTCTE is $400 \times 10^{-7}$/° C. or greater.

In an aspect (19), the disclosure provides the glass composition of any of aspects (1)-(18), wherein the glass composition has a temperability, $\psi$, and the temperability, $\psi$, is equal to or greater than 0.80. In an aspect (20), the disclosure provides the glass composition of aspect (19), wherein the temperability, $\psi$, is equal to or greater than 0.85. In an aspect (21), the disclosure provides the glass composition of aspect (19), wherein the temperability, $\psi$, is equal to or greater than 0.90.

In an aspect (22), the disclosure provides a glass composition comprising 60-65 mol % $SiO_2$, 5-10 mol % $Al_2O_3$, 3-10 mol % MgO, 5-15 mol % CaO, 8-15 mol % $Na_2O+K_2O$, 0-15 mol % $Na_2O$, 0-15 mol % $K_2O$, >0-4 mol % $TiO_2$, 1.5-6 mol % $B_2O_3$ and >0-2 mol % $CeO_2$, $Ho_2O_3$, CuO, NiO, or combinations thereof and wherein the glass composition has a low temperature coefficient of thermal expansion (LTCTE) measured from 25° C. to 300° C. and a high temperature coefficient of thermal expansion (HTCTE) measured at temperature above glass transition region, and wherein the sum of the LTCTE and the HTCTE is $350 \times 10^{-7}$/° C. or greater and the glass composition has a temperability, $\psi$, and the temperability, $\psi$, is equal to or greater than 0.80. In an aspect (23), the disclosure provides the glass composition of aspect (22), wherein sum of the LTCTE and the HTCTE is $40 \times 10^{-7}$/° C. or greater. In an aspect (24), the disclosure provides the glass composition of aspect (22) or aspect (23), wherein the temperability, $\psi$, is equal to or greater than 0.90.

In an aspect (25), the disclosure provides a glass composition comprising 65-72 mol % $SiO_2$, 4-10 mol % $Al_2O_3$, 3-10 mol % MgO, >0-5 mol % CaO, 10-16 mol % $Na_2O+K_2O$, 10-16 mol % $Na_2O$, 0-10 mol % $K_2O$, 1.5-8 mol % $B_2O_3$, >0-4 mol % $TiO_2$ and >0-2 mol % $CeO_2$, $Ho_2O_3$, CuO, NiO, or combinations thereof and wherein the glass composition has a low temperature coefficient of thermal expansion (LTCTE) measured from 25° C. to 300° C. and a high temperature coefficient of thermal expansion (HTCTE) measured at temperature above glass transition region, and wherein the sum of the LTCTE and the HTCTE is $400×10^{-7}/°$ C. or greater; and the glass composition has a temperability, ψ, and the temperability, ψ, is equal to or greater than 0.80. In an aspect (26), the disclosure provides the glass composition of aspect (25), wherein the temperability, ψ, is equal to or greater than 0.90.

In an aspect (27), the disclosure provides a glass composition comprising 65-70 mol % $SiO_2$, >0-5 mol % $Al_2O_3$, 5-10 mol % MgO, 6-13 mol % CaO, 10-16 mol % $Na_2O+K_2O$, 2-16 mol % $Na_2O$, 0-8 mol % $K_2O$, 1-6 mol % $B_2O_3$, >0-4 mol % $TiO_2$ and >0-2 mol % $CeO_2$, $Ho_2O_3$, CuO, NiO, or combinations thereof and wherein the glass composition has a low temperature coefficient of thermal expansion (LTCTE) measured from 25° C. to 300° C. and a high temperature coefficient of thermal expansion (HTCTE) measured at temperature above glass transition region, and wherein the sum of the LTCTE and the HTCTE is $400×10^{-7}/°$ C. or greater and the glass composition has a temperability, ψ, and the temperability, ψ, is equal to or greater than 0.80. In an aspect (28), the disclosure provides the glass composition of aspect (27), wherein the temperability, ψ, is equal to or greater than 0.90.

In an aspect (29), the disclosure provides a glass composition comprising 65-70 mol % $SiO_2$, >0-5 mol % $Al_2O_3$, 4-8 mol % MgO, 7-11 mol % CaO, 9-14 mol % $Na_2O+K_2O$, 0-14 mol % $Na_2O$, 0-14 mol % $K_2O$, 1-6 mol % $B_2O_3$, >0-4 mol % $TiO_2$ and >0-2 mol % $CeO_2$, $Ho_2O_3$, CuO, NiO, or combinations thereof and wherein the glass composition has a low temperature coefficient of thermal expansion (LTCTE) measured from 25° C. to 300° C. and a high temperature coefficient of thermal expansion (HTCTE) measured at temperature above glass transition region, and wherein the sum of the LTCTE and the HTCTE is $350×10^{-7}/°$ C. or greater and the glass composition has a temperability, ψ, and the temperability, ψ, is equal to or greater than 0.80. In an aspect (30), the disclosure provides the glass composition of aspect (29), wherein the temperability, ψ, is equal to or greater than 0.90. In an aspect (31), the disclosure provides the glass composition of aspect (29) or aspect (30), wherein the sum of the LTCTE and the HTCTE is $370×10^{-7}/°$ C. or greater. In an aspect (32), the disclosure provides the glass composition of any of aspects (29)-(31), wherein the sum of the LTCTE and the HTCTE is $400×10^{-7}/°$ C. or greater. In an aspect (33), the disclosure provides the glass composition of any of aspects (22)-(32), comprising 2-4 mol % $TiO_2$. In an aspect (34), the disclosure provides the glass composition of any of aspects (22)-(33), comprising 0-1 mol % $CeO_2$. In an aspect (35), the disclosure provides the glass composition of any of aspects (22)-(33), comprising 0-1 mol % CuO. In an aspect (36), the disclosure provides the glass composition of any of aspects (1)-(35), wherein the glass composition exhibits a color presented in SCE color space coordinates with the following values: a*=from about −10 to about 30; b*=from about 0 to about 30; and L*>83. In an aspect (37), the disclosure provides the glass composition of any of aspects (1)-(36), wherein the glass composition when rolled into a 2 mm thick slab has a transmission and wherein the transmission is greater than 80% at 575 nm. In an aspect (38), the disclosure provides the glass composition of any of aspects (1)-(37), wherein the glass is free of BaO and SrO.

In an aspect (39), the disclosure provides a process of making the glass composition of any of aspects (1)-(38), comprising: glass batch melting the oxides in the glass composition and maintaining the glass batch melt at temperatures ranging from 1250-1650° C. for a time ranging from about 6-16 hours. 40. In an aspect (40), the disclosure provides the process of aspect (39), further comprising thermally tempering the glass composition. In an aspect (41), the disclosure provides the process of aspect (39) or aspect (40), further comprising chemically tempering the glass composition.

In an aspect (42), the disclosure provides an electronic device comprising the glass composition of any of aspects (1)-(38). In an aspect (43), the disclosure provides a photovoltaic device comprising a front substrate, a back substrate and a photovoltaic cell, wherein at least one of the front substrate or the back substrate comprises the glass composition of any of aspects (1)-(38). In an aspect (44), the disclosure provides photovoltaic device comprising a front substrate, a back substrate and a photovoltaic cell, wherein the front substrate and the back substrate each have a thickness, and the thickness of the front substrate is from 2 mm to 4 mm and the thickness of the back substrate is from 1 mm to 4 mm, and wherein the front substrate comprises the glass composition of any of aspects (1)-(37). In an aspect (45), the disclosure provides the photovoltaic device of aspect (44), wherein the sum of the thickness of the front substrate and the back substrate is 4 mm or less. In an aspect (46), the disclosure provides the photovoltaic device of any of aspects (43)-(45), wherein the photovoltaic cell comprises a polycrystalline silicon material. In an aspect (47), the disclosure provides the photovoltaic device of aspect (46), wherein the polycrystalline silicon material has a SCE color in L*a*b* space of from of L*<30, 0<a*<20, and −30<b*<0. In an aspect (48), the disclosure provides the photovoltaic device of any of aspects (42)-(47), wherein the combination of the glass composition and the photovoltaic cell has a SCE color in L*a*b* space of L*<50, −5<a*<10, and −10<b*<5.

BRIEF DESCRIPTION OF THE DRAWINGS

The invention can be understood from the following detailed description, either alone or together with the accompanying drawing figures.

DETAILED DESCRIPTION

Figure 1:
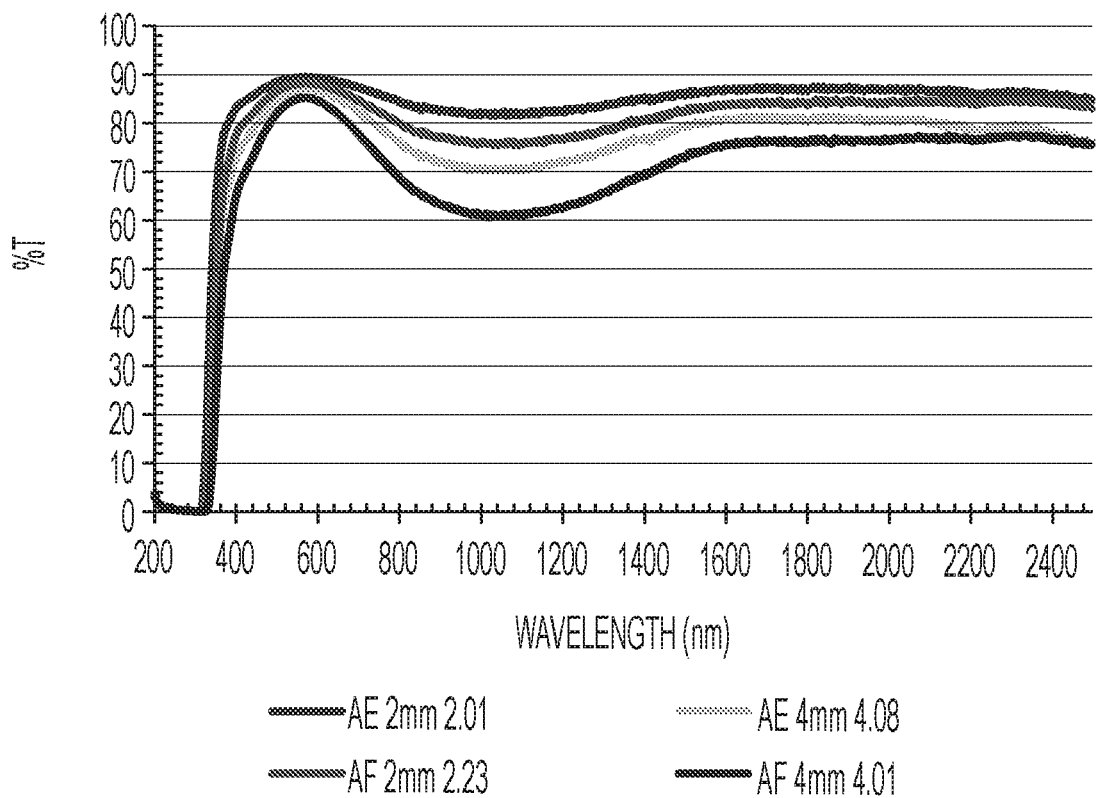
FIG. 1 shows visible and near infrared spectra for a number of example embodiments from Table 2.

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of $Al_2O_3$" is one in which $Al_2O_3$ is not actively added or batched into the glass, but may be present in very small amounts as a contaminant (e.g., 500, 400, 300, 200, or 100 parts per million (ppm) or less or).

Unless otherwise specified, all compositions are expressed in terms of mole percent (mol %). Coefficients of thermal expansion (CTE) are expressed in terms of $10^{-7}/°$ C., unless otherwise specified. The low temperature CTE (LTCTE) is measured over a temperature range from 25° C. to 300° C. and expressed in terms of $10^{-7}/°$ C. The high temperature CTE (HTCTE) is measured at the temperature above glass transition region and expressed in terms of $10^{-7}/°$ C. The sum of the LTCTE and the HTCTE is expressed in terms of $10^{-7}/°$ C. The density in terms of grams/cm$^3$ was measured via the Archimedes method (ASTM C693). Young's modulus, shear modulus, and Poisson's Ratio were measured via the ASTM C623 standard.

Glass Compositions

In thermal tempering, a glass product is heated to near the softening temperature and then rapidly quenched, for example, by blowing cold air on the surfaces. As a result, the glass will possess a lower surface temperature than the interior during cooling. As the center of the glass cools more slowly to room temperature it contracts to a smaller specific volume while the high specific volume of the surface layer remains unchanged. This leads to a surface compressive layer that gives tempered glass its strength. The difference in specific volume is due to a combination of differences in the thermal expansion of the glass upon cooling and from a fictive temperature difference between the surface and the bulk. To a first approximation, the stress distribution in thermally tempered glass can be represented by a simple parabola, with the magnitude of the surface compressive stress approximately equal to twice the center tension.

When thermally tempered glass breaks, unlike annealed glass, it shatters into rock-salt like pieces which do not have sharp edges or needle-like shapes. This behavior is particularly useful for situations where safe fracture behavior is necessary and it is for this reason that characterizing the fracture behavior of thermally tempered glass is of paramount importance. The desired fracture behavior is called "dicing" and occurs when the glass has achieved full temper. The dicing threshold of tempered glass is a somewhat arbitrarily defined fracture behavior which can be considered "safe" to the user in the event of glass failure. Standards for dicing thresholds exist worldwide, such as ASTM C1048 and ANSI Z97.1 in the United States, EN12150-1 in Europe, GOST 5727-88 in Russia, JIS R 3206 in Japan, and GB 15763.2 in China (all of which are hereby incorporated by reference). The standards across countries are similar in that they generally state a fragmented piece of tempered soda-lime glass is required to contain at least 30-40 fragments in an area of 50 mm×50 mm (1.6 fragments/cm$^2$) for thick glasses (>3 mm), while Japanese standards in particular require at least 60 fragments in the case of thinner glass.

It is of interest to predict the ability of a glass composition to produce stresses during thermal tempering. The simplest approximation one can make in forming a more general expression is to assume that for any chosen combination of glass thickness and quenching rate, the stress formed due to thermal strain is a fraction of the maximum possible. Therefore a general expression for the compressive tempering stress formed when quenched from a constant viscosity can be expressed as:

$$\sigma_{Cs} = C(h, t, \eta) * \psi(E, \alpha_{CTE}^s, \alpha_{CTE}^L, T_{soft}, T_{strain})$$

where E is the Young's modulus of the glass, $\alpha^s_{CTE}$ is the CTE of the glass in solid form, $\alpha^L_{CTE}$ is the CTE of the glass in liquid form, $T_{soft}$ is the softening point temperature, $T_{strain}$ is the strain point temperature, and the constant, $\Psi$, is a material property called the "temperability parameter" and is representative of the maximum thermal strain that can be formed if the surface was frozen upon quenching. The maximum thermal strain can be roughly estimated by a 2-step integration of the thermal expansion as a function of temperature and general glass properties. The coefficient of thermal expansion (CTE) is assumed to be a constant from room temperature to the strain point, and then constant again from the strain point to softening. With this in mind and with the assumption that room temperature is close to 0° C., a more general "temperability parameter" can be expressed as:

$$\psi = E * [T_{strain} * \alpha_{CTE}^s + \alpha_{CTE}^L * (T_{soft} - T_{strain})]$$

where E is in GPa, temperatures are given in ° C., and α is in ° C.$^{-1}$. It can be seen that this expression contains a more general form of the volumetric strain calculated using the strain point of the glass between glassy and liquid behavior.

By measuring a few standard properties for a given glass, it is possible to estimate the temper stresses that would be expect to form if the constant, C(h,t,η), is known. This constant has been evaluated using modeling for a wide range of known compositions, and from the calculation of Ψ, the relative temperability of various glass compositions can be quickly compared to one another. When the temperabilities of a variety glass compositions are calculated, the results show that various combinations of properties can reach a similar temperability and that glasses with vast differences in the compositions and properties can be nearly indistinguishable in terms of temperability.

The glasses disclosed herein have high coefficients of thermal expansion and high Young's moduli and can be used with a thermal tempering process to obtain improved tempering when compared to commercially available glasses. The glasses described herein are needed to satisfy a growing demand for stronger but thinner thermally strengthened glasses for commercial electronics, automotive and architectural applications where durability and/or scratch resistance are desired along with a "safe" break pattern. As glass becomes thinner, it becomes harder to produce any thermal tempering stresses at all and the central tension required for a safe "dicing" fracture pattern increases—producing a compound challenge. Developing glasses which produce enhanced temper stresses can help to meet this challenge. Additionally, the glasses must also retain a significant chemical durability, as they will likely be exposed to the elements for extended periods of time.

It has been found that glasses having temperability parameters, Ψ, of 0.8 or higher, 0.85 or higher, or even 0.9 or higher, are capable of increased thermal tempering. In some embodiments, to improve temperability, it has been found that the low temperature coefficient of thermal expansion (LTCTE) should be $55 \times 10^{-7}/°$ C. or greater. In some embodiments, it has been found that the high temperature coefficient of thermal expansion (HTCTE) should be $270 \times 10^{-7}/°$ C. or greater. In some embodiments, it has been found that in order to improve temperability, the sum of the LTCTE and HTCTE should be greater than $350 \times 10^{-7}/°$ C., $370 \times 10^{-7}/°$ C., or $400 \times 10^{-7}/°$ C. The invention is a novel glass composition space that has high coefficients of thermal expansion and Young's modulus. In some embodiments, it has been found that glass compositions have improved temperability when the Young's modulus is greater than 67 GPa and the temperability factor is greater than or equal to 0.75 (The approximate value of commercially available soda-lime glass).

In some embodiments, the glass comprises a combination of $SiO_2$, $Na_2O$ or $K_2O$, $Al_2O_3$, $B_2O_3$ or ZnO, and alkaline earth oxides. For example, embodiments may comprise 55 mol % to 75 mol % $SiO_2$ (55 mol %≤$SiO_2$≤75 mol %); greater than 0 mol % $Al_2O_3$ (0 mol %<$Al_2O_3$); greater than 0 mol % MgO (0 mol %<MgO); greater than 0 mol % CaO (0 mol %<CaO); 6 mol % to 16 mol % $Na_2O+K_2O$≤16 mol %≤$Na_2O+K_2O$≤16 mol %); 0 mol % to 16 mol % $Na_2O$ (0 mol %≤$Na_2O$≤16 mol %); 0 mol % to 16 mol % $K_2O$ (0 mol %≤$K_2O$≤16 mol %); and one or more of $B_2O_3$ or ZnO, wherein $B_2O_3$, when present, comprises 1 mol % to 10 mol % (1 mol %≤$B_2O_3$≤10 mol %); and ZnO, when present, comprises greater than 0 mol % to 8 mol % (0 mol %<ZnO≤8 mol %).

In some embodiments, the glass comprises a combination of $SiO_2$, $Na_2O$ or $K_2O$, $Al_2O_3$, $B_2O_3$, and alkaline earth oxides. For example, embodiments may comprise 60 mol % to 65 mol % $SiO_2$ (60 mol %≤$SiO_2$≤65 mol %); 5 mol % to 10 mol % $Al_2O_3$ (5 mol %≤$Al_2O_3$≤10 mol %); 3 mol % to 10 mol % MgO (3 mol %≤MgO≤10 mol %); 5 mol % to 15 mol % CaO (5 mol %≤CaO≤15 mol %); 8 mol % to 15 mol % $Na_2O+K_2O$ (8 mol %'$Na_2O+K_2O$≤15 mol %); 0 mol % to 15 mol % $Na_2O$ (0 mol %≤$Na_2O$≤15 mol %); 0 mol % to 15 mol % $K_2O$ (0 mol %≤$K_2O$≤15 mol %); and 1.5 mol % to 6 mol % $B_2O_3$ (1.5 mol %≤$B_2O_3$≤6 mol %).

Alternative embodiments may comprise 65 mol % to 70 mol % $SiO_2$ (65 mol %≤$SiO_2$≤70 mol %); greater than 0 mol % to 5 mol % $Al_2O_3$ (0 mol %≤$Al_2O_3$≤5 mol %); 4 mol % to 8 mol % MgO (4 mol %≤MgO≤8 mol %); 7 mol % to 11 mol % CaO (7 mol %≤CaO≤11 mol %); 9 mol % to 14 mol % $Na_2O+K_2O$ (9 mol %≤$Na_2O+K_2O$≤14 mol %); 0 mol % to 14 mol % $Na_2O$ (0 mol %≤$Na_2O$≤14 mol %); 0 mol % to 14 mol % $K_2O$ (0 mol %≤$K_2O$≤14 mol %); and 1 mol % to 6 mol % $B_2O_3$ (1 mol % ≤$B_2O_3$≤6 mol %).

Still other embodiments may comprise 65 mol % to 70 mol % $SiO_2$ (65 mol % ≤$SiO_2$≤70 mol %); greater than 0 mol % to 5 mol % $Al_2O_3$ (0 mol %≤$Al_2O_3$≤5 mol %); 5 mol % to 10 mol % MgO (5 mol %≤MgO≤10 mol %); 6 mol % to 13 mol % CaO (6 mol %≤CaO≤13 mol %); 10 mol % to 16 mol % $Na_2O+K_2O$ (10 mol %≤$Na_2O+K_2O$≤16 mol %); 2 mol % to 16 mol % $Na_2O$ (2 mol %≤$Na_2O$≤16 mol %); 0 mol % to 8 mol % $K_2O$ (0 mol %≤$K_2O$≤8 mol %); and 1 mol % to 6 mol % $B_2O_3$ (1 mol %≤$B_2O_{3≤6}$ mol %).

Still other embodiments may comprise 65 mol % to 72 mol % $SiO_2$ (65 mol % ≤$SiO_2$≤72 mol %); 4 mol % to 10 mol % $Al_2O_3$ (4 mol %≤$Al_2O_3$≤10 mol %); 3 mol % to 10 mol % MgO (3 mol %≤MgO≤10 mol %); >0 mol % to 13 mol % CaO (0 mol %<CaO≤13 mol %); 10 mol % to 16 mol % $Na_2O+K_2O$ (10 mol %≤$Na_2O+K_2O$≤16 mol %); 10 mol % to 16 mol % $Na_2O$ (10 mol %≤$Na_2O$≤16 mol %); 0 mol % to 6 mol % $K_2O$ (0 mol %≤$K_2O$≤6 mol %); and 1.5 mol % to 8 mol % $B_2O_3$ (1.5 mol % ≤$B_2O_3$≤8 mol %). Additional aspects of the various constituents that can make up the embodied compositions are detailed below.

$SiO_2$, which is the largest oxide component of the embodied glasses, may be included to provide high temperature stability and chemical durability. In some embodiments, the glass can comprise from 55 to 75 mol % $SiO_2$. In some embodiments, the glass can comprise from 60 to 72 mol % $SiO_2$. In some embodiments, the glass can comprise from 65 to 72 mol % $SiO_2$. In some embodiments, the glass can comprise from 65 to 70 mol % $SiO_2$. In some embodiments, the glass can comprise 55 to 75 mol %, 63 to 72 mol %, 65 to 72 mol %, 68 to 72 mol %, 60 to 70 mol %, 63 to 70 mol %, 65 to 70 mol %, 68 to 70 mol %, 60 to 68 mol %, 63 to 68 mol %, 65 to 68 mol %, 60 to 65 mol %, 63 to 65 mol %, or 60 to 63 mol % $SiO_2$. In some embodiments, the glass comprises 55, 56, 57, 58, 59, 60, 61, 62, 63, 64, 65, 66, 67, 68, 69, 70, 71, 72, 73, 74, or 75 mol % $SiO_2$.

$Al_2O_3$ may influence the structure of the glass and, additionally, lower the liquidus temperature and coefficient of thermal expansion, or enhance the strain point. In some embodiments, the glass can comprise greater than 0 mol % $Al_2O_3$. In some embodiments, the glass can comprise from >0 to 12 mol % $Al_2O_3$. In some embodiments, the glass can comprise from >0 to 5 mol %, 4 to 10 mol %, 5 to 10 mol % $Al_2O_3$ or >0 to 3 mol % $Al_2O_3$. In some embodiments, the glass can comprise from 0.5 to 4 mol % $Al_2O_3$. In some embodiments, the glass can comprise from >0 to 12 mol %, >0 to 10 mol %, >0 to 8 mol %, >0 to 6 mol %, >0 to 4 mol %, >0 to 2 mol %, 1 to 12 mol %, 1 to 10 mol %, 1 to 8 mol %, 1 to 6 mol %, 1 to 4 mol %, 1 to 2 mol %, 3 to 8 mol %, 3 to 6 mol %, 3 to 10 mol %, 3 to 12 mol %, 5 to 8 mol %, 5 to 10 mol %, 5 to 12 mol %, 7 to 12 mol %, 7 to 10 mol %, or 8 to 10 mol % $Al_2O_3$. In some embodiments, the glass can comprise about >0, 1, 2, 3, 4, 5, 6, 7, 8, 9, 10, 11 or 12 mol % $Al_2O_3$.

Without being bound by theory, it is believed that incorporating $B_2O_3$ into the glasses described herein impacts the coefficient of thermal expansion, especially at high temperatures, and improves the temperability of the glasses. In some embodiments, when present, the glass can comprise >0 mol % to 10 mol % $B_2O_3$. In some embodiments, the glass can comprise from 1 to 10 mol %, 1 mol % to 8 mol % or from 1 mol % to 6 mol % $B_2O_3$. In some embodiments, the glass can comprise from about 1.5 to 8 mol % $B_2O_3$ or 1.5 to 6 mol % $B_2O_3$. In some embodiments, the glass can comprise from 1 to 4 mol % $B_2O_3$. In some embodiments, the glass can comprise from 1 to 10 mol %, 1.5 to 10 mol %, 2 to 10 mol %, 4 to 10 mol %, 1 to 8 mol %, 1.5 to 8 mol %, 2 to 8 mol %, 4 to 8 mol %, 1 to 6 mol %, 1.5 to 6 mol %, 2 to 6 mol %, 4 to 6 mol %, 1 to 4 mol %, 1.5 to 4 mol %, 2 to 4 mol %, 1.5 to 3 mol %, or 1 to 3 mol % $B_2O_3$. In some embodiments, the glass can comprise about 0, >0, 0.5, 1, 1.5, 2, 3, 4, 5, 6, 7, 8, 9, or 10 mol % $B_2O_3$.

In some embodiments, the amount of boron in the glass is constrained by the amount of sodium and potassium in the glass minus the amount of aluminum. In some embodiments, the amount of boron is dictated by the formula:

$$boron \leq (sodium + potassium) - aluminum$$

where the amounts of the various constituents are in mol % of their oxides. In some such embodiments, by keeping boron within this parameter range, it is possible to ensure that it primarily remains tetrahedrally coordinated in the glass.

Zinc oxide, ZnO, may be present and influence the glass properties, including the Young's modulus. In some embodiments, when ZnO is present, the glass can comprise greater than 0 to 8 mol % $ZrO_2$ or, in some embodiments, from 3 to 8 mol % or 3 to 5 mol % ZnO. In some embodiments, the glass can comprise 0, >0, 1, 2, 3, 4, 5, 6, 7, or 8 mol % ZnO.

Without wanting to be bound by theory, it is believed that in some embodiments, ZnO and $B_2O_3$ may have similar effects on the material properties. Therefore, in some embodied glasses the sum of the mol % of ZnO and $B_2O_3$ may be critical or the combination of ZnO and $B_2O_3$ in the glass may have an overall effect on the temperability of the glass. In some embodiments, when $B_2O_3$ is present in the glass, the glass is free of ZnO. Alternatively, in some embodiments, when ZnO is present in the glass, the glass is free of $B_2O_3$.

Alkaline earth oxides may improve desirable properties in the materials, including influencing the Young's modulus and the coefficient of thermal expansion. In some embodiments, the glass comprises from >0 mol % to about 20 mol % MO (0 mol % ≤ MO ≤ 20 mol %), where M is the sum of the alkaline earth metals Mg, Ca, Sr, and Ba, in the glass. In some embodiments, the glass can comprise from >0 to 18 mol % MO. In some embodiments, the glass can comprise from >0 to 16 mol % MO. In some embodiments, the glass can comprise about >0, 1, 2, 3, 4, 5, 6, 7, 8, 9, 10, 11, 12, 13, 14, 15, 16, 17, 18, 19, or 20 mol % MO.

In some embodiments, the glasses comprise MgO, CaO, or SrO. In some embodiments, the glass can comprise greater than 0 mol % MgO. In some embodiments, the glass can comprise from >0 to 10 mol % MgO. In some embodiments, the glass can comprise from 3 to 10 mol %, 5 to 10 mol %, 5 to 8 mol % MgO. In some embodiments, the glass can comprise from >0 to 10 mol %, >0 to 8 mol %, >0 to 6 mol %, >0 to 4 mol %, >0 to 2 mol %, 1 to 10 mol %, 1 to 8 mol %, 1 to 6 mol %, 1 to 4 mol %, 1 to 2 mol %, 3 to 8 mol %, 3 to 6 mol %, 3 to 10 mol %, 5 to 8 mol %, 5 to 10 mol %, 7 to 10 mol %, or 8 to 10 mol % MgO. In some embodiments, the glass can comprise about >0, 1, 2, 3, 4, 5, 6, 7, 8, 9, or 10 mol % MgO.

In some embodiments, the glass can comprise greater than 0 mol % CaO. In some embodiments, the glass can comprise from >0 to 15 mol % CaO. In some embodiments, the glass can comprise from >0 to 5 mol %, 6 to 13 mol %, 5 to 15 mol %, 7 to 13 mol %, 7 to 11 mol %, 8 to 12 mol % CaO. In some embodiments, the glass can comprise from >0 to 15 mol %, >0 to 13 mol %, >0 to 11 mol %, >0 to 9 mol %, >0 to 7 mol %, >0 to 5 mol %, 1 to 15 mol %, 1 to 13 mol %, 1 to 11 mol %, 1 to 9 mol %, 1 to 7 mol %, 1 to 5 mol %, 3 to 15 mol %, 3 to 13 mol %, 3 to 11 mol %, 3 to 9 mol %, 3 to 7 mol %, 3 to 5 mol %, 5 to 15 mol %, 5 to 13 mol %, 5 to 11 mol %, 5 to 9 mol %, 5 to 7 mol %, 7 to 15 mol %, 7 to 13 mol %, 7 to 11 mol %, 7 to 9 mol %, 9 to 15 mol %, 9 to 13 mol %, 9 to 11 mol %, 11 to 15 mol %, or 11 to 13 mol % CaO. In some embodiments, the glass can comprise about >0, 1, 2, 3, 4, 5, 6, 7, 8, 9, 10, 11, 12, 13, 14, or 15 mol % CaO.

SrO may be present in some embodiments and in such embodiments, the glass can comprise from 0 to 5 mol % SrO. In some embodiments, the glass can comprise from >0 to 5 mol % SrO. In some embodiments, the glass can comprise from about >0 to 3.5 mol % SrO or 0.2 to 3 mol % SrO. In some embodiments, the glass can comprise from 1 to 4 mol % SrO. In some embodiments, the glass can comprise from 0.2 to 5 mol %, 0.2 to 4 mol %, 0.2 to 3 mol %, 0.2 to 2 mol %, >0 to 5 mol %, >0 to 4 mol %, >0 to 3 mol %, >0 to 2 mol %, 1 to 5 mol %, 1 to 4 mol %, or 1 to 3 mol % SrO. In some embodiments, the glass can comprise about 0, >0, 1, 2, 3, 4, or 5 mol % SrO.

BaO may be present in some embodiments and in such embodiments, the glass can comprise from 0 to 15 mol % BaO. In some embodiments, the glass can comprise from 0 to 10 mol %, >0 to 5 mol %, 6 to 13 mol %, 5 to 15 mol %, 7 to 13 mol %, 7 to 11 mol %, 8 to 12 mol % BaO. In some embodiments, the glass can comprise from >0 to 15 mol %, >0 to 13 mol %, >0 to 11 mol %, >0 to 9 mol %, >0 to 7 mol %, >0 to 5 mol %, 1 to 15 mol %, 1 to 13 mol %, 1 to 11 mol %, 1 to 9 mol %, 1 to 7 mol %, 1 to 5 mol %, 3 to 15 mol %, 3 to 13 mol %, 3 to 11 mol %, 3 to 9 mol %, 3 to 7 mol %, 3 to 5 mol %, 5 to 15 mol %, 5 to 13 mol %, 5 to 11 mol %, 5 to 9 mol %, 5 to 7 mol %, 7 to 15 mol %, 7 to 13 mol %, 7 to 11 mol %, 7 to 9 mol %, 9 to 15 mol %, 9 to 13 mol %, 9 to 11 mol %, 11 to 15 mol %, or 11 to 13 mol % BaO. In some embodiments, the glass can comprise about >0, 1, 2, 3, 4, 5, 6, 7, 8, 9, 10, 11, 12, 13, 14, or 15 mol % BaO.

$Na_2O$ and $K_2O$ may improve the temperability of the glass and influence the coefficient of thermal expansion, especially at low temperatures. In some embodiments, the glass can comprise from 0 to 16 mol % $Na_2O$. In some embodiments, the glass can comprise >0 to 15 mol % $Na_2O$. In some embodiments, the glass can comprise 10 to 16 mol % $Na_2O$. In some embodiments, the glass can comprise 2 to 16 mol % $Na_2O$. In some embodiments, the glass can comprise from 0 to 16 mol %, 0 to 15 mol %, 0 to 14 mol %, 0 to 10 mol %, 0 to 8 mol %, 0 to 5 mol %, >0 to 16 mol %, >0 to 15 mol %, >0 to 14 mol %, >0 to 10 mol %, >0 to 8 mol %, >0 to 5 mol %, 2 to 16 mol %, 2 to 15 mol %, 2 to 14 mol %, 2 to 10 mol %, 2 to 8 mol %, 2 to 5 mol %, 5 to 16 mol %, 5 to 15 mol %, 5 to 14 mol %, 5 to 10 mol %, 5 to 8 mol %, 8 to 16 mol %, 8 to 15 mol %, 8 to 14 mol %, 8 to 10 mol %, 10 to 16 mol %, 10 to 15 mol %, or 10 to 14 mol % $Na_2O$. In some embodiments, the glass can comprise 0, >0, 1, 2, 3, 4, 5, 6, 7, 8, 9, 10, 11, 12, 13, 14, 15, or 16 mol % $Na_2O$.

In some embodiments, the glass can comprise from 0 to 16 mol % $K_2O$. In some embodiments, the glass can comprise >0 to 15 mol % $K_2O$. In some embodiments, the glass can comprise 0 to 8 mol % $K_2O$. In some embodiments, the glass can comprise 0 to 6 mol % $K_2O$. In some embodiments, the glass can comprise from 0 to 16 mol %, 0 to 15 mol %, 0 to 14 mol %, 0 to 10 mol %, 0 to 8 mol %, 0 to 5 mol %, >0 to 16 mol %, >0 to 15 mol %, >0 to 14 mol %, >0 to 10 mol %, >0 to 8 mol %, >0 to 5 mol %, 2 to 16 mol %, 2 to 15 mol %, 2 to 14 mol %, 2 to 10 mol %, 2 to 8 mol %, 2 to 5 mol %, 5 to 16 mol %, 5 to 15 mol %, 5 to 14 mol %, 5 to 10 mol %, 5 to 8 mol %, 8 to 16 mol %, 8 to 15 mol %, 8 to 14 mol %, 8 to 10 mol %, 10 to 16 mol %, 10 to 15 mol %, or 10 to 14 mol % $K_2O$. In some embodiments, the glass can comprise 0, >0, 1, 2, 3, 4, 5, 6, 7, 8, 9, 10, 11, 12, 13, 14, 15, or 16 mol % $K_2O$.

In some embodiments, $Li_2O$ may be present and in such embodiments, the glass can comprise from 0 to 5 mol % $Li_2O$. In some embodiments, the glass can comprise from >0 to 5 mol % $Li_2O$. In some embodiments, the glass can comprise from about >0 to 3.5 mol % $Li_2O$ or 0.2 to 3 mol % $Li_2O$. In some embodiments, the glass can comprise from 1 to 4 mol % $Li_2O$. In some embodiments, the glass can comprise from 0.2 to 5 mol %, 0.2 to 4 mol %, 0.2 to 3 mol %, 0.2 to 2 mol %, >0 to 5 mol %, >0 to 4 mol %, >0 to 3 mol %, >0 to 2 mol %, 1 to 5 mol %, 1 to 4 mol %, or 1 to 3 mol % $Li_2O$. In some embodiments, the glass can comprise about 0, >0, 1, 2, 3, 4, or 5 mol % $Li_2O$.

In some embodiments, the total amount of the alkalis $Na_2O$ and $K_2O$ or $Li_2O$, $Na_2O$, and $K_2O$ is important to the glass properties. In some embodiments, the glass can comprise 6 to 16 mol % $Na_2O+K_2O$ or $Li_2O+Na_2O+K_2O$. In some embodiments, the glass can comprise 8 to 16 mol % $Na_2O+K_2O$ or $Li_2O+Na_2O+K_2O$. In some embodiments, the glass can comprise 8 to 15 mol % $Na_2O+K_2O$ or $Li_2O+Na_2O+K_2O$. In some embodiments, the glass can comprise 10 to 16 mol % $Na_2O+K_2O$ or $Li_2O+Na_2O+K_2O$. In some embodiments, the glass can comprise 9 to 14 mol % $Na_2O+K_2O$ or $Li_2O+Na_2O+K_2O$. In some embodiments, the glass can comprise from 6 to 16 mol %, 8 to 16 mol %, 10 to 16 mol %, 6 to 15 mol %, 8 to 15 mol %, 10 to 15 mol %, 6 to 14 mol %, 8 to 14 mol %, 10 to 14 mol %, 6 to 12 mol %, 8 to 12 mol %, 10 to 12 mol %, 6 to 10 mol %, 8 to 10 mol %, or 6 to 8 mol % $Na_2O+K_2O$ or $Li_2O+Na_2O+K_2O$. In some embodiments, the glass can comprise 6, 7, 8, 9, 10, 11, 12, 13, 14, 15, or 16 mol % $Na_2O+K_2O$ or $Li_2O+Na_2O+K_2O$.

$TiO_2$ is critical both to the color of the glass as well as other attributes and the glass can comprise from >0 to 4 mol % $TiO_2$. In some embodiments, the glass can comprise from about >0 to 3.5 mol % $TiO_2$ or 0.2 to 4 mol % $TiO_2$. In some embodiments, the glass can comprise from 1 to 4 mol % $TiO_2$. In some embodiments, the glass can comprise from 0.2 to 4 mol %, 0.2 to 3.5 mol %, 0.2 to 3 mol %, 0.2 to 2.5 mol %, >0 to 4 mol %, >0 to 3.5 mol %, >0 to 3 mol %, >0 to 2.5 mol %, 1 to 4 mol %, 1 to 3.5 mol %, or 1 to 3 mol % $TiO_2$. In some embodiments, the glass can comprise about 0, >0, 1, 2, 2.5, 3, 3.5, or 4 mol % $TiO_2$.

Additional components can be incorporated into the glass to provide additional benefits or may be incorporated as contaminants typically found in commercially-prepared glass. For example, additional components can be added as fining agents (e.g., to facilitate removal of gaseous inclusions from melted batch materials used to produce the glass) and/or for other purposes. In some embodiments, the glass may comprise one or more compounds useful as ultraviolet radiation absorbers. In some embodiments, the glass can comprise 3 mol % or less CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The glasses, according to some embodiments, can also include various contaminants associated with batch materials and/or introduced into the glass by the melting, fining, and/or forming equipment used to produce the glass. For example, in some embodiments, the glass can comprise from 0 to about 3 mol %, 0 to about 2 mol %, 0 to about 1 mol %, 0 to about 0.5 mol %, 0 to about 0.1 mol %, 0 to about 0.05 mol %, or 0 to about 0.01 mol % $SnO_2$ or $Fe_2O_3$, or combinations thereof.

Non-limiting examples of amounts of precursor oxides for forming the embodied glasses are listed in Table 1, along with the properties of the resulting glasses.

TABLE 1

| Sample | Glaverbel soda-lime | A | B | C | D | E | F | G |
|---|---|---|---|---|---|---|---|---|
| $SiO_2$ (mol %) | 70.06 | 68.10 | 67.22 | 65.43 | 67.11 | 69.03 | 68.48 | 60.40 |
| $B_2O_3$ (mol %) | 0.00 | 1.77 | 3.41 | 5.34 | 4.31 | 3.13 | 5.06 | 1.98 |
| $Al_2O_3$ (mol %) | 1.17 | 0.95 | 0.96 | 0.96 | 0.99 | 1.01 | 0.97 | 8.71 |
| MgO (mol %) | 6.49 | 6.77 | 6.56 | 6.54 | 6.69 | 6.78 | 4.03 | 6.63 |
| CaO (mol %) | 8.69 | 9.06 | 9.01 | 8.98 | 9.21 | 9.44 | 8.95 | 9.11 |
| SrO (mol %) | 0.00 | 0.00 | 0.00 | 0.00 | 0.00 | 0.00 | 0.00 | 0.00 |
| $Na_2O$ (mol %) | 13.33 | 12.86 | 12.40 | 12.32 | 6.39 | 0.02 | 12.11 | 12.60 |
| $K_2O$ (mol %) | 0.25 | 0.50 | 0.43 | 0.43 | 5.30 | 10.60 | 0.40 | 0.47 |
| ZnO (mol %) | 0.00 | 0.00 | 0.00 | 0.00 | 0.00 | 0.00 | 0.00 | 0.00 |
| $SnO_2$ (mol %) | 0.00 | 0.02 | 0.00 | 0.00 | 0.01 | 0.00 | 0.01 | 0.09 |
| LTCTE ($10^{-7}$/° C.) | 88 | 86.5 | 84.7 | 84.2 | 84.7 | 81.6 | 82.0 | 84 |
| HTCTE ($10^{-7}$/° C.) | 270 | 338.0 | 392.0 | 446.0 | 435.0 | 319.0 | 430.0 | 324.0 |
| Young's Modulus (GPa) | 72.0 | 76.2 | 77.2 | 79.2 | 76.0 | 78.8 | 78.3 | 78.4 |
| Shear Modulus (GPa) | — | 31.2 | 31.9 | 32.2 | 31.0 | 32.3 | 32.1 | 32.0 |
| Poisson's Ratio | — | 0.219 | 0.212 | 0.229 | 0.225 | 0.222 | 0.219 | 0.226 |
| Strain Point (° C.) | 507 | 512 | 521 | 522 | 532 | 598 | 526 | 557 |
| Anneal Point (° C.) | 549 | 550 | 557 | 557 | 569 | 643 | 563 | 598 |
| Softening Point (° C.) | 728 | 714 | 713 | 705 | 733 | 829 | 716 | 774 |

TABLE 1-continued

| | | | | | | | | |
|---|---|---|---|---|---|---|---|---|
| Density (g/cm³) | 2.540 | 2.519 | 2.528 | 2.535 | 2.509 | 2.471 | 2.519 | 2.539 |
| SOC (TPa⁻¹) | 2.720 | 2.730 | 2.698 | 2.696 | 2.728 | 2.820 | 2.769 | 2.868 |
| Refractive Index | 1.520 | 1.5236 | 1.5267 | 1.5292 | 1.5247 | 1.5172 | 1.5260 | 1.5272 |
| VFT - a | — | −1.469 | −1.103 | −1.086 | −1.601 | −1.736 | −1.234 | −1.881 |
| VFT - b | — | 3794.1 | 3054.6 | 2868.8 | 3916.3 | 4270.5 | 3207.9 | 4625.2 |
| VFT - $T_0$ | — | 301.9 | 367.7 | 379.2 | 313.1 | 376.8 | 352.2 | 286.4 |
| Liquidus Viscosity (Poise) | — | 11088 | 7677 | 4886 | 20712 | 40459 | 29243 | — |
| Temperability, ψ | 0.75 | 0.86 | 0.92 | 0.99 | 1.01 | 0.96 | 0.98 | 0.94 |
| HTCTE + LTCTE ($10^{-7}$/° C.) | 358 | 424.5 | 476.7 | 530.2 | 519.7 | 400 | 512 | 408 |

| Sample | Glaverbel soda-lime | H | I | J | K | L | M | N |
|---|---|---|---|---|---|---|---|---|
| SiO₂ (mol %) | 70.06 | 58.76 | 56.86 | 57.23 | 57.70 | 59.66 | 70.39 | 70.50 |
| B₂O₃ (mol %) | 0.00 | 3.73 | 5.52 | 5.24 | 5.03 | 5.53 | 7.77 | 9.76 |
| Al₂O₃ (mol %) | 1.17 | 9.05 | 9.13 | 9.19 | 9.18 | 9.01 | 5.99 | 3.98 |
| MgO (mol %) | 6.49 | 6.52 | 6.50 | 6.52 | 6.45 | 3.94 | 7.23 | 7.03 |
| CaO (mol %) | 8.69 | 9.09 | 9.00 | 9.16 | 9.02 | 8.75 | 0.06 | 0.06 |
| SrO (mol %) | 0.00 | 0.00 | 0.00 | 0.00 | 0.00 | 0.00 | 0.00 | 0.00 |
| Na₂O (mol %) | 13.33 | 12.32 | 12.44 | 6.52 | 0.10 | 12.54 | 8.47 | 8.57 |
| K₂O (mol %) | 0.25 | 0.46 | 0.45 | 6.06 | 12.44 | 0.48 | 0.01 | 0.01 |
| ZnO (mol %) | 0.00 | 0.00 | 0.00 | 0.00 | 0.00 | 0.00 | 0.00 | 0.00 |
| SnO₂ (mol %) | 0. | 0.09 | 0.09 | 0.09 | 0.09 | 0.09 | 0.05 | 0.05 |
| LTCTE ($10^{-7}$/° C.) | 88 | 83.2 | 83 | 89 | 89 | 83 | 59 | 58 |
| HTCTE ($10^{-7}$/° C.) | 270 | 340 | 280 | 360 | 270 | 420 | 281 | 327 |
| Young's Modulus (GPa) | 72.0 | 78.3 | 78.3 | 75.8 | 68.0 | 77.6 | 69.71 | 70.74 |
| Shear Modulus (GPa) | — | 31.9 | 31.8 | 30.6 | 27.6 | 31.6 | 28.89 | 29.44 |
| Poisson's Ratio | — | 0.226 | 0.232 | 0.238 | 0.229 | 0.229 | 0.206 | 0.202 |
| Strain Point (° C.) | 507 | 543 | 536 | 541 | 589 | 537 | 543 | 532 |
| Anneal Point (° C.) | 549 | 584 | 576 | 583 | 634 | 577 | 587 | 575 |
| Softening Point (° C.) | 728 | 765 | 748 | 764 | 843 | 748 | 812 | 766 |
| Density (g/cm³) | 2.540 | 2.536 | 2.535 | 2.52 | 2.486 | 2.521 | 2.363 | 2.363 |
| SOC (TPa⁻¹) | 2.720 | 2.783 | 2.792 | 2.843 | 2.861 | 2.737 | 3.398 | 3.345 |
| Refractive Index | 1.520 | 1.5289 | 1.5298 | 1.5266 | 1.5212 | 1.5264 | 1.4951 | 1.4964 |
| VFT - a | — | −1.514 | −1.345 | −1.994 | −2.387 | −1.441 | −3.154 | −2.402 |
| VFT - b | — | 3916.1 | 3518.8 | 4730.7 | 5460.2 | 3873 | 9067.9 | 7058.4 |
| VFT - $T_0$ | — | 335.4 | 354.3 | 271.2 | 296 | 319.3 | −54.2 | 44.4 |
| Temperability, ψ | 0.75 | 0.94 | 0.80 | 0.98 | 0.82 | 1.03 | 0.75 | 0.76 |
| HTCTE + LTCTE ($10^{-7}$/° C.) | 358 | 423 | 363 | 449 | 359 | 502 | 340 | 385 |

| Sample | Glaverbel soda-lime | O | P | Q | R | S | T | U |
|---|---|---|---|---|---|---|---|---|
| SiO₂ (mol %) | 70.06 | 70.53 | 70.70 | 70.71 | 70.55 | 63.11 | 62.26 | 63.12 |
| B₂O₃ (mol %) | 0.00 | 7.80 | 9.67 | 7.62 | 7.77 | 0 | 0 | 0 |
| Al₂O₃ (mol %) | 1.17 | 6.02 | 4.01 | 3.99 | 4.00 | 11.58 | 11.41 | 10.58 |
| MgO (mol %) | 6.49 | 4.97 | 5.06 | 7.01 | 8.98 | 0.00 | 0.00 | 0.00 |
| CaO (mol %) | 8.69 | 0.04 | 0.04 | 0.06 | 0.07 | 0.00 | 0.00 | 0.00 |
| SrO (mol %) | 0.00 | 0.00 | 0.00 | 0.00 | 0.00 | 0.00 | 0.00 | 0.00 |
| Na₂O (mol %) | 13.33 | 10.54 | 10.42 | 10.51 | 8.54 | 16.43 | 16.81 | 16.41 |
| K₂O (mol %) | 0.25 | 0.01 | 0.01 | 0.01 | 0.01 | 1.88 | 1.94 | 1.89 |
| ZnO (mol %) | 0.00 | 0.00 | 0.00 | 0.00 | 0.00 | 1.93 | 3.12 | 1.94 |
| SnO₂ (mol %) | 0.22 | 0.05 | 0.05 | 0.05 | 0.05 | 0.05 | 0.05 | 0.05 |
| LTCTE (($10^{-7}$/° C.) | 88 | 65 | 64 | 66 | 59 | 10 | 10.3 | 10.2 |
| HTCTE ($10^{-7}$/° C.) | 270 | 344 | 340 | 360 | 327 | 176 | 188 | 173 |
| Young's Modulus (GPa) | 72.0 | 70.05 | 71.50 | 72.19 | 71.91 | 66.19 | 67.78 | 65.22 |
| Shear Modulus (GPa) | — | 29.23 | 29.79 | 29.99 | 29.85 | 27.44 | 27.99 | 27.03 |
| Poisson's Ratio | — | 0.198 | 0.201 | 0.203 | 0.203 | 0.206 | 0.21 | 0.207 |
| Strain Point (° C.) | 507 | 532 | 522 | 531 | 545 | 615 | 605 | 628 |
| Anneal Point (° C.) | 549 | 576 | 564 | 573 | 584 | 672 | 661 | 688 |
| Softening Point (° C.) | 728 | 778 | 748 | 758 | 780 | 912 | 927 | 911 |
| Density (g/cm³) | 2.540 | 2.379 | 2.383 | 2.393 | 2.379 | 2.432 | 2.459 | 2.414 |
| SOC (TPa⁻¹) | 2.720 | 3.287 | 3.284 | 3.225 | 3.289 | 3.104 | 3.108 | 3.107 |
| Refractive Index | 1.520 | 1.497 | 1.4982 | 1.4991 | 1.4982 | 1.4902 | 1.4948 | 1.4862 |
| VFT - a | — | −2.120 | −1.385 | −2.166 | −2.528 | −2.656 | −2.515 | −1.732 |
| VFT - b | — | 6504.5 | 4601.5 | 6190.8 | 7167.1 | 7560.6 | 7279.9 | 5405.9 |
| VFT - $T_0$ | — | 89.2 | 231.8 | 112.9 | 62.2 | 90.7 | 109.2 | 273.5 |

TABLE 1-continued

| | | | | | | | | |
|---|---|---|---|---|---|---|---|---|
| Temperability, ψ | 0.75 | 0.84 | 0.79 | 0.84 | 0.78 | 0.77 | 0.83 | 0.75 |
| HTCTE + LTCTE ($10^{-7}/°C$) | 358 | 409 | 404 | 426 | 386 | 279 | 291 | 275 |

| Sample | Glaverbel soda-lime | V | W | X | Y | Z |
|---|---|---|---|---|---|---|
| $SiO_2$ (mol %) | 70.06 | 63.29 | 60.87 | 65.43 | 62.23 | 62.53 |
| $B_2O_3$ (mol %) | 0.00 | 0.00 | 0.00 | 16.86 | 5.90 | 5.98 |
| $Al_2O_3$ (mol %) | 1.17 | 9.58 | 11.52 | 3.7 | 0.96 | 0.96 |
| MgO (mol %) | 6.49 | 0.00 | 0.00 | 0.00 | 6.49 | 6.37 |
| CaO (mol %) | 8.69 | 0.00 | 0.00 | 0.00 | 9.07 | 8.96 |
| SrO (mol %) | 0.00 | 0.00 | 0.00 | 3.06 | 0.00 | 0.00 |
| $Na_2O$ (mol %) | 13.33 | 16.34 | 16.63 | 6.47 | 12.79 | 12.64 |
| $K_2O$ (mol %) | 0.25 | 1.90 | 1.87 | 0 | 0.47 | 0.46 |
| ZnO (mol %) | 0.00 | 2.93 | 2.94 | 0 | 0.00 | 0.00 |
| $SnO_2$ (mol %) | 0.22 | 0.05 | 0.05 | 0.05 | 0.11 | 0.11 |
| $Fe_2O_3$ (mol %) | | | | | 0.03 | 0.05 |
| $TiO_2$ (mol %) | | | | | 1.96 | 1.93 |
| LTCTE ($10^{-7}/°C$) | 88 | 104 | 101 | 62 | | |
| HTCTE ($10^{-7}/°C$) | 270 | 170 | 180 | 394 | | |
| Young's Modulus (GPa) | 72.0 | 65.64 | 65.84 | 78.53 | | |
| Shear Modulus (GPa) | — | 27.37 | 27.17 | 32.41 | | |
| Poisson's Ratio | — | 0.199 | 0.213 | 0.212 | | |
| Strain Point (°C) | 507 | 638 | 612 | 492 | | |
| Anneal Point (°C) | 549 | 700 | 671 | 527 | | |
| Softening Point (°C) | 728 | 931 | 907 | 673 | | |
| Density (g/cm³) | 2.540 | 2.425 | 2.442 | 2.432 | | |
| SOC ($TPa^{-1}$) | 2.720 | 3.149 | 3.149 | 3.105 | | |
| Refractive Index | 1.520 | 1.4867 | 1.4903 | 1.5116 | | |
| VFT - a | — | −0.116 | −2.665 | −0.779 | | |
| VFT - b | — | 2364 | 7338.2 | 2734.7 | | |
| VFT - $T_0$ | — | 629.2 | 118.9 | 347.9 | | |
| Temperability, ψ | 0.75 | 0.78 | 0.76 | 0.79 | | |
| HTCTE + LTCTE ($10^{-7}/°C$) | 358 | 275 | 281 | 456 | | |

| Sample | Glavrbel soda-lime | AA | AB | AC | AD | AE | AF | AG | AH | AI |
|---|---|---|---|---|---|---|---|---|---|---|
| $SiO_2$ (mol %) | 70.06 | 63.84 | 61.90 | 63.04 | 64.19 | 62.30 | 63.34 | 59.80 | 58.75 | 59.84 |
| $B_2O_3$ (mol %) | 0.00 | 7.01 | 9.14 | 8.48 | 8.17 | 8.88 | 8.40 | 11.32 | 10.76 | 11.24 |
| $Al_2O_3$ (mol %) | 1.17 | 0.97 | 0.97 | 0.98 | 0.98 | 0.98 | 0.98 | 0.96 | 0.98 | 0.97 |
| MgO (mol %) | 6.49 | 6.60 | 6.54 | 6.66 | 6.57 | 6.63 | 6.57 | 6.48 | 6.60 | 6.52 |
| CaO (mol %) | 8.69 | 9.13 | 9.07 | 7.14 | 4.99 | 7.09 | 4.99 | 9.02 | 9.01 | 7.04 |
| SrO (mol %) | 0.00 | | | | | | | | | |
| $Na_2O$ (mol %) | 13.33 | 12.08 | 12.00 | 11.98 | 11.93 | 13.76 | 15.37 | 12.02 | 11.55 | 12.00 |
| $K_2O$ (mol %) | 0.25 | 0.37 | 0.37 | 1.70 | 3.15 | 0.35 | 0.33 | 0.39 | 0.33 | 0.38 |
| ZnO (mol %) | 0.00 | | | | | | | | | |
| $SnO_2$ (mol %) | 0.22 | | | | | | | | | |
| $TiO_2$ (mol %) | 0.00 | | | | | | | 0.00 | 2.01 | 1.99 |
| LTCTE (($10^{-7}/°C$) | 8.8 | 85.7 | 84.9 | 89.8 | 91.6 | 89.3 | 92.4 | 84.9 | 84 | 82.8 |
| HTCTE ($10^{-7}/°C$) | 27.0 | 442 | 474 | 456 | | | | | | |
| Young's Modulus (GPa) | 72.0 | 79.8 | 80.5 | 78.6 | 77.9 | 79.2 | 77.5 | 81.7 | 82.7 | 81.7 |
| Shear Modulus (GPa) | — | 32.5 | 32.8 | 32.2 | 31.9 | 32.4 | 31.5 | 33.3 | 33.6 | 33.3 |
| Poisson's Ratio | — | 0.227 | 0.227 | 0.222 | 0.224 | 0.223 | 0.231 | 0.227 | 0.228 | 0.227 |
| Strain Point (°C) | 507 | 519.6 | 520.8 | 510.7 | 499.5 | 512.8 | 504.3 | | | |
| Anneal Point (°C) | 549 | 557.9 | 558.2 | 547.8 | 537.9 | 550.3 | 541.2 | 556.1 | 559.9 | 557.4 |
| Softening Point (°C) | 728 | 706.4 | 700.2 | 693.5 | 687.7 | 691.3 | 683.6 | 518.7 | 522.8 | 520.6 |
| Density (g/cm³) | 2.540 | 2.541 | 2.544 | 2.529 | 2.511 | 2.535 | 2.523 | 2.547 | 2.570 | 2.551 |
| SOC ($TPa^{-1}$) | 2.720 | 2.721 | 2.725 | 2.754 | 2.751 | 2.739 | 2.763 | 2.751 | 2.792 | 2.835 |
| Refractive Index | 1.520 | 1.5311 | 1.5331 | 1.5279 | 1.5229 | 1.5291 | 1.5249 | 1.5348 | 1.5481 | 1.5431 |
| VFT - a | — | — | — | — | — | — | — | | | |
| VFT - b | — | — | — | — | — | — | — | | | |
| VFT - $T_0$ | — | — | — | — | — | — | — | | | |
| Temperability, Ψ | 0.75 | 1.01 | 1.04 | 1.02 | | | | | | |
| HTCTE + LTCTE ($10^{-7}/°C$) | 358 | 527.7 | 558.9 | 545.8 | | | | | | |

| Sample | AJ | AK | AL | AM | AN | AO |
|---|---|---|---|---|---|---|
| $SiO_2$ | 61 | 60 | 60 | 58 | 62 | 60 |
| $B_2O_3$ | 6 | 6 | 6 | 6 | 6 | 6 |
| $Al_2O_3$ | 1.0 | 1.0 | 1.0 | 1.0 | 1.0 | 1.0 |
| MgO | 6.5 | 6.5 | 6.5 | 6.5 | 6.5 | 6.5 |
| CaO | 9.0 | 9.0 | 9.0 | 9.0 | 9.0 | 9.0 |

TABLE 1-continued

| | | | | | | |
|---|---|---|---|---|---|---|
| $Na_2O$ | 13.0 | 13.0 | 13.0 | 13.0 | 13.0 | 13.0 |
| $K_2O$ | 0.5 | 0.5 | 0.5 | 0.5 | 0.5 | 0.5 |
| $TiO_2$ | 3.0 | 4.0 | 2.0 | 2.0 | 0.0 | 0.0 |
| $P_2O_5$ | 0.0 | 0.0 | 0.0 | 0.0 | 0.0 | 0.0 |
| $V_2O_5$ | 0.0 | 0.0 | 2.0 | 4.0 | 2.0 | 4.0 |
| $Fe_2O_3$ | batch | batch | batch | batch | batch | batch |

| Sample | AP | AQ | AR | AS | AT | AU | AV | AW | AX |
|---|---|---|---|---|---|---|---|---|---|
| $SiO_2$ | 59.8 | 59.7 | 59.6 | 59.55 | 59.5 | 59.45 | 59.4 | 59.2 | 59.9 |
| $B_2O_3$ | 6 | 6 | 6 | 6 | 6 | 6 | 6 | 6 | 6 |
| $Al_2O_3$ | 1 | 1 | 1 | 1 | 1 | 1 | 1 | 1 | 1 |
| MgO | 6.5 | 6.5 | 6.5 | 6.5 | 6.5 | 6.5 | 6.5 | 6.5 | 6.5 |
| CaO | 9 | 9 | 9 | 9 | 9 | 9 | 9 | 9 | 9 |
| $Na_2O$ | 13 | 13 | 13 | 13 | 13 | 13 | 13 | 13 | 13 |
| $K_2O$ | 0.5 | 0.5 | 0.5 | 0.5 | 0.5 | 0.5 | 0.5 | 0.5 | 0.5 |
| $TiO_2$ | 4 | 4 | 4 | 4 | 4 | 4 | 4 | 4 | 4 |
| $CeO_2$ | 0.1 | 0.2 | 0.3 | 0.35 | 0.4 | 0.45 | 0.5 | 0.7 | 0.9 |
| $SnO_2$ | 0.1 | 0.1 | 0.1 | 0.1 | 0.1 | 0.1 | 0.1 | 0.1 | 0.1 |
| $Fe_2O_3$ | batch | batch | batch | batch | batch | batch | batch | batch | batch |

In addition to having high fracture toughness, the glasses described herein can have color and transparency/translucency properties that make them advantageous for a number of applications. For example, the glasses may have a "non-white" color that is a function of coloring components in the glass. Color as used herein, describes the color presented in SCE color space coordinates (determined from reflectance spectra measurements using a spectrophotometer, with illuminant D65 and specular reflectance excluded), of the glass at a certain thickness. The color may be a result of single or multiple additives to the glass. In some embodiments, the glasses above further comprise a coloring component. While embodiments are described in more detail below, the coloring components may comprise, for example, $Fe_2O_3$, $V_2O_5$, $Cr_2O_3$, $TiO_2$, $MnO_2$, $CeO_2$, NiO, ZnO, CuO, NiO, $Co_3O_4$, rare earth oxides, and combinations thereof. In some cases, the total mol % of coloring component is from 0 to 5 mol %, 0 to 4 mol %, 0 to 3 mol %, 0 to 2 mol %, 0 to 1 mol %, >0 to 0.1, >0 to 0.5, >0 to 1, >0 to 2, >0 to 3, or >0 to 4 mol %.

In some embodiments, in addition to $SiO_2$, $Al_2O_3$, MgO, CaO, $Na_2O$ and/or $K_2O$, and $B_2O_3$ and/or ZnO, the composition further comprises $TiO_2$ and $Fe_2O_3$. The combination of $TiO_2$ and $Fe_2O_3$ provides glasses with high visible transmission, while at the same time producing a greenish-yellow glass. Table 2 provides example embodied compositions comprising $TiO_2$ and $Fe_2O_3$. L*a*b* values are shown in the last rows for a number of examples with the glass thickness being either 2 mm or 4 mm.

FIG. 1 provides the visible and near IR spectrum of a number of the examples embodied in Table 2. As can be seen in the figure, increasing the iron content (comparing Example AE to Example AF at two different thicknesses) results in a drop in infrared transmission, most notably around 600-1600 nm. This transmission drop can be detrimental in certain applications such as photovoltaics where the photovoltaic cell absorbs in this region. Therefore, it is generally advantageous to keep the amount of $Fe_2O_3$ as low as possible. In some embodiments described herein, the amount of $TiO_2$ is from >0 to 4, >0 to 3, >0 to 2, >0 to 1, >0 to 0.5, >0 to 0.1, 1 to 4, 1 to 3, 1 to 2, 2 to 4, 2 to 3, or 3 to 4 mol %, while the amount of $Fe_2O_3$ present is from >0 to 0.005, >0 to 0.01, >0 to 0.05, >0 to 0.1, >0 to 0.5, or >0 to 1 mol %.

In some embodiments, in addition to $SiO_2$, $Al_2O_3$, MgO, CaO, $Na_2O$ and/or $K_2O$, and $B_2O_3$ and/or ZnO, the composition further comprises $TiO_2$ and CuO and/or $CeO_2$. Table 3 provides example embodied compositions comprising $TiO_2$ and CuO and/or $CeO_2$. L*a*b* values are shown in the last rows for a number of examples with the glass thickness being either 2.7 mm or 4 mm.

TABLE 2

| Batched (mol %) | AA | AB | AC | AD | AE | AF |
|---|---|---|---|---|---|---|
| $SiO_2$ | 62.9 | 62.9 | 62.9 | 61.9 | 61.9 | 61.9 |
| $B_2O_3$ | 1 | 1 | 1 | 1 | 1 | 1 |
| $Al_2O_3$ | 6 | 6 | 6 | 6 | 6 | 6 |
| MgO | 6.5 | 6.5 | 6.5 | 6.5 | 6.5 | 6.5 |
| CaO | 9 | 9 | 9 | 9 | 9 | 9 |
| $Na_2O$ | 13 | 13 | 13 | 13 | 13 | 13 |
| $K_2O$ | 0.5 | 0.5 | 0.5 | 0.5 | 0.5 | 0.5 |
| $TiO_2$ | 1 | 1 | 1 | 2 | 2 | 2 |
| $Fe_2O_3$ | 0.015 | 0.03 | 0.06 | 0.015 | 0.03 | 0.06 |
| $SnO_2$ | 0.1 | 0.1 | 0.1 | 0.1 | 0.1 | 0.1 |
| L* (2 mm/4 mm) | | | | | 88.07/84.43 | 86.76/82.63 |
| a* (2 mm/4 mm) | | | | | −1.72/−3.32 | −2.51/−4.48 |
| b* (2 mm/4 mm) | | | | | 6.72/12.21 | 9.14/15.11 |

TABLE 3

| Batched (mol %) | BA | BB | BC | BD | BE | BF |
|---|---|---|---|---|---|---|
| $SiO_2$ | 61.25 | 61.29 | 61.18 | 61.17 | 61 | 61.25 |
| $Al_2O_3$ | 0.99 | 0.99 | 0.99 | 0.99 | 0.99 | 0.99 |
| $B_2O_3$ | 5.93 | 5.94 | 5.93 | 5.93 | 5.91 | 5.94 |
| $Na_2O$ | 12.87 | 12.88 | 12.85 | 12.85 | 12.82 | 12.87 |
| $K_2O$ | 0.49 | 0.49 | 0.49 | 0.49 | 0.49 | 0.49 |
| MgO | 6.43 | 6.43 | 6.42 | 6.42 | 6.4 | 6.43 |
| CaO | 8.9 | 8.91 | 8.89 | 8.89 | 8.87 | 8.9 |
| SnO | 0.1 | 0.1 | 0.1 | 0.1 | 0.1 | 0.1 |
| $TiO_2$ | 2.9 | 2.9 | 2.9 | 2.89 | 2.89 | 2.89 |
| CuO | 0.12 | 0.06 | 0.24 | 0 | 0 | 0 |
| $CeO_2$ | 0 | 0 | 0 | 0.27 | 0.54 | 0.14 |
| $Fe_2O_3$ | 0.0003 | 0.0003 | 0.0003 | 0.0003 | 0.0003 | 0.0003 |
| L* (2.7 mm/4 mm) | 1.6/0.77 | 1.54/2.09 | 2.28/5.58 | 88.6/87.35 | 87.24/85.58 | 88.59/86.62 |
| a* (2.7 mm/4 mm) | 5.41/0.75 | 5.85/8.93 | 10.06/24.15 | −3.5/−4.51 | −4.87/−5.54 | −2.48/−3.05 |
| b* (2.7 mm/4 mm) | 0.78/−0.28 | 1.01/1.57 | 2.13/6.3 | 14.7/19.62 | 24.02/31.62 | 11.07/15.09 |

Figure 2:
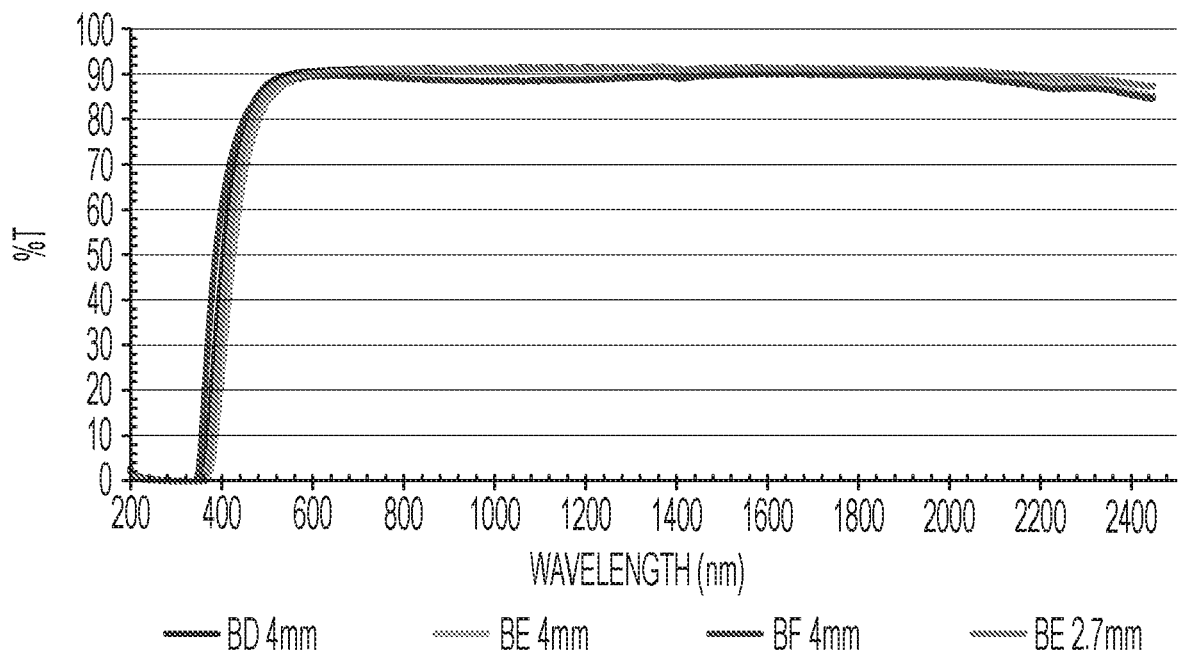
FIG. 2 shows visible and near infrared spectra for a number of example embodiments from Table 3.

The visible and near IR spectra for some of the embodiments are shown in FIG. 2. As can be seen in the figure, the embodied compounds have a relatively high transmission across most of the visible and near infrared, with a transmission around 90% from 600 nm out to about 2000 nm. Iron content was minimized and this reflected in the large increase in IR transmission between the 600-1600 nm wavelengths, as well as the rest of the IR range. Below 600 nm, the compounds start absorbing with close to 0% transmission at 350-375 nm, giving the compounds a yellow color. The UV/blue wavelength absorption is potentially useful in some applications where the materials behind the glass are sensitive to ultraviolet light or higher energy photons. Such materials may include colorants, dyes, polymers, etc. In some colored embodiments comprising $TiO_2$ and CuO and/or $CeO_2$, the amount of $TiO_2$ is from >0 to 4, >0 to 3, >0 to 2, >0 to 1, >0 to 0.5, >0 to 0.1, 1 to 4, 1 to 3, 1 to 2, 2 to 4, 2 to 3, or 3 to 4 mol %, the amount of CuO is from 0 to 1, 0 to 0.5, 0 to 0.3, 0 to 0.2, 0 to 0.1, >0 to 0.01, >0 to 0.05, >0 to 0.1, >0 to 0.5, 0.05 to 0.3, 0.1 to 0.4, 0.1 to 0.3, or >0 to 1 mol %, and the amount of $CeO_2$ is from 0 to 1, 0 to 0.5, 0 to 0.3, 0 to 0.2, 0 to 0.1, >0 to 0.01, >0 to 0.05, >0 to 0.1, >0 to 0.5, 0.05 to 0.3, 0.1 to 0.4, 0.1 to 0.3, or >0 to 1 mol %.

In some embodiments, in addition to $SiO_2$, $Al_2O_3$, MgO, CaO, $Na_2O$ and/or $K_2O$, and $B_2O_3$ and/or ZnO, the composition further comprises NiO and optionally $TiO_2$. Table 4 provides example embodied compositions comprising NiO and optionally $TiO_2$.

TABLE 4

| Batched (mol %) | CA | CB | CC | CD | CE | CF |
|---|---|---|---|---|---|---|
| $SiO_2$ | 61.87 | 61.88 | 61.89 | 63.13 | 63.15 | 63.16 |
| $Al_2O_3$ | 1 | 1 | 1 | 1.02 | 1.02 | 1.02 |
| $B_2O_3$ | 6 | 6 | 6 | 6.12 | 6.12 | 6.12 |
| MgO | 6.5 | 6.5 | 6.5 | 6.63 | 6.63 | 6.63 |
| CaO | 9 | 9 | 9 | 9.18 | 9.18 | 9.18 |
| $Na_2O$ | 13.00 | 13.00 | 13.00 | 13.46 | 13.46 | 13.46 |
| $K_2O$ | 0.5 | 0.5 | 0.5 | 0.51 | 0.51 | 0.51 |
| $TiO_2$ | 2 | 2 | 2 | 0 | 0 | 0 |
| NiO | 0.05 | 0.025 | 0.015 | 0.05 | 0.025 | 0.015 |
| $SnO_2$ | 0.1 | 0.1 | 0.1 | 0.1 | 0.1 | 0.1 |
| $Fe_2O_3$ | 0.014 | 0.014 | 0.014 | 0.014 | 0.014 | 0.014 |

Figure 3:
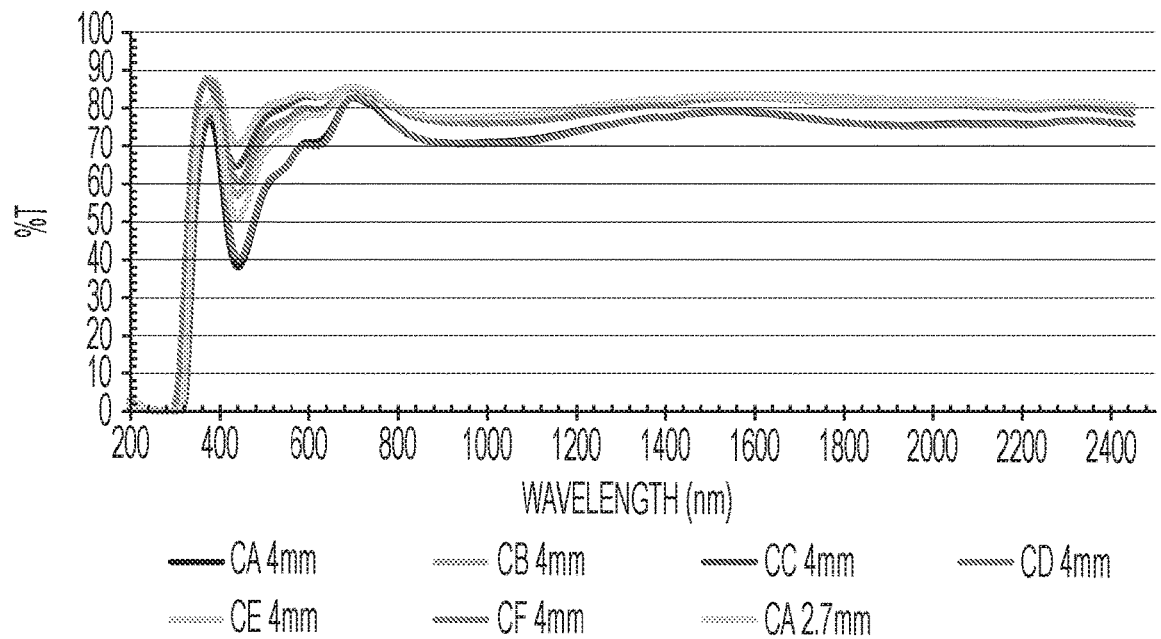
FIG. 3 shows visible and near infrared spectra for a number of example embodiments from Table 4.

The visible and near IR spectra for some of the embodiments are shown in FIG. 3. As can be seen in the figure, the nickel-containing glasses have additional absorption around ~450 nm, ~650 nm, as well as in the infrared wavelengths. Iron content was minimized, but was larger than in the compounds in Table 3, mildly impacting the absorbance in the 600-1600 nm range. In some colored embodiments comprising NiO and optionally, $TiO_2$, the amount of NiO is from 0 to 1, 0 to 0.5, 0 to 0.3, 0 to 0.2, 0 to 0.1, >0 to 0.01, >0 to 0.05, >0 to 0.1, >0 to 0.5, 0.05 to 0.3, 0.1 to 0.4, 0.1 to 0.3, or >0 to 1 mol %, and the amount of $TiO_2$ is from >0 to 4, >0 to 3, >0 to 2, >0 to 1, >0 to 0.5, >0 to 0.1, 1 to 4, 1 to 3, 1 to 2, 2 to 4, 2 to 3, or 3 to 4 mol %.

In some embodiments, in addition to $SiO_2$, $Al_2O_3$, MgO, CaO, $Na_2O$ and/or $K_2O$, and $B_2O_3$ and/or ZnO, the composition further comprises $CeO_2$ and/or $Ho_2O_3$, optionally with $TiO_2$. Table 5 provides example embodied compositions comprising $CeO_2$ and/or $Ho_2O_3$, optionally with $TiO_2$. L*a*b* values are shown in the last rows for embodiments, where the glass thickness is either 2.7 mm or 4 mm.

TABLE 5

| Oxides | DA | DB | DC | DD | DE | DF | DG | DH | DI |
|---|---|---|---|---|---|---|---|---|---|
| $SiO_2$ | 61.7 | 61.5 | 61.7 | 61.5 | 63.7 | 63.5 | 63.7 | 63.5 | 61.5 |
| $Al_2O_3$ | 6 | 6 | 6 | 6 | 6 | 6 | 6 | 6 | 6 |
| $B_2O_3$ | 1 | 1 | 1 | 1 | 1 | 1 | 1 | 1 | 1 |
| MgO | 6.5 | 6.5 | 6.5 | 6.5 | 6.5 | 6.5 | 6.5 | 6.5 | 6.5 |
| CaO | 9 | 9 | 9 | 9 | 9 | 9 | 9 | 9 | 9 |
| $Na_2O$ | 13 | 13 | 13 | 13 | 13 | 13 | 13 | 13 | 13 |
| $K_2O$ | 0.5 | 0.5 | 0.5 | 0.5 | 0.5 | 0.5 | 0.5 | 0.5 | 0.5 |
| $TiO_2$ | 2 | 2 | 2 | 2 | 0 | 0 | 0 | 0 | 2 |
| $CeO_2$ | 0.2 | 0.4 | 0 | 0 | 0.2 | 0.4 | 0 | 0 | 0.2 |
| $Ho_2O_3$ | 0 | 0 | 0.2 | 0.4 | 0 | 0 | 0.2 | 0.4 | 0.2 |
| $SnO_2$ | 0.1 | 0.1 | 0.1 | 0.1 | 0.1 | 0.1 | 0.1 | 0.1 | 0.1 |
| $Fe_2O_3$ | 0.015 | 0.015 | 0.015 | 0.015 | 0.015 | 0.015 | 0.015 | 0.015 | 0.015 |
| L* (2.7 mm) | 89.04 | 88.35 | 85.74 | 84.41 | 89.7 | 89.38 | 87.79 | 86.25 | 87.25 |
| a* (2.7 mm) | −2.28 | −3.48 | −4.4 | −4.98 | −0.56 | −0.76 | −4.41 | −5.27 | −5.12 |
| b* (2.7 mm) | 9.56 | 15.18 | 20.84 | 26.99 | 3.6 | 4.78 | 15.52 | 22.48 | 23.04 |
| L* (4 mm) | 87.95 | 87.25 | 84.36 | 82.33 | 89.04 | 88.54 | 86.13 | 84.51 | 85.84 |
| a* (4 mm) | −3.11 | −4.3 | −5.04 | −4.88 | −0.67 | −0.92 | −5.43 | −5.63 | −5.87 |
| b* (4 mm) | 13.11 | 19.6 | 24.41 | 30.75 | 3.95 | 5.56 | 19.22 | 25.61 | 28.63 |

Figure 4:
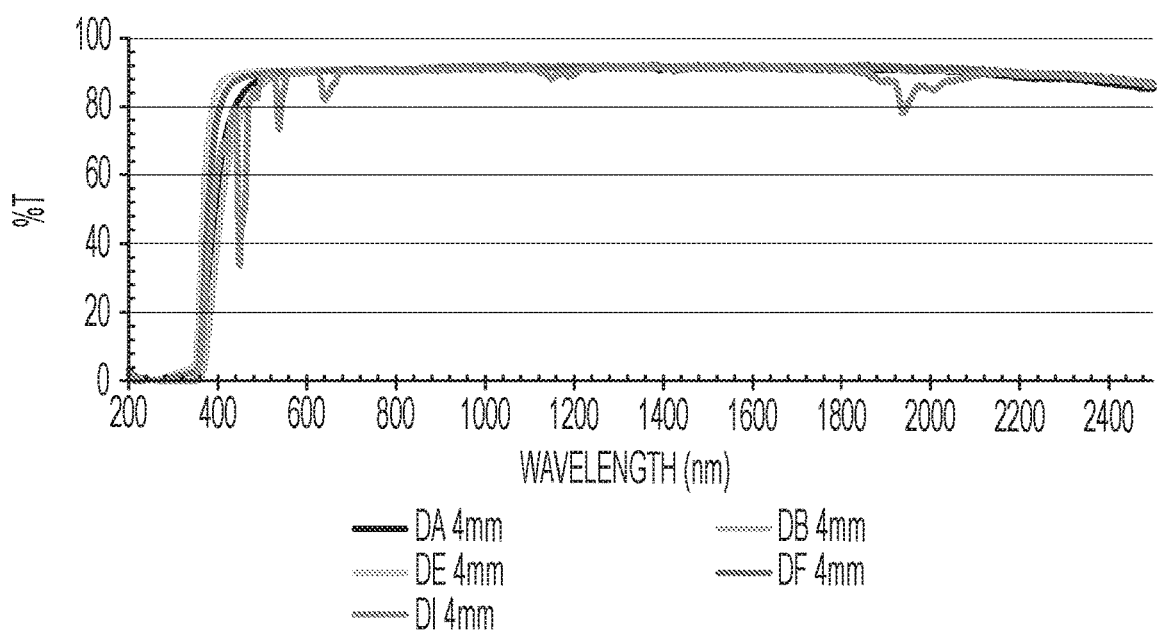
FIG. 4 shows visible and near infrared spectra for a number of example cerium-containing embodiments from Table 5.
Figure 5:
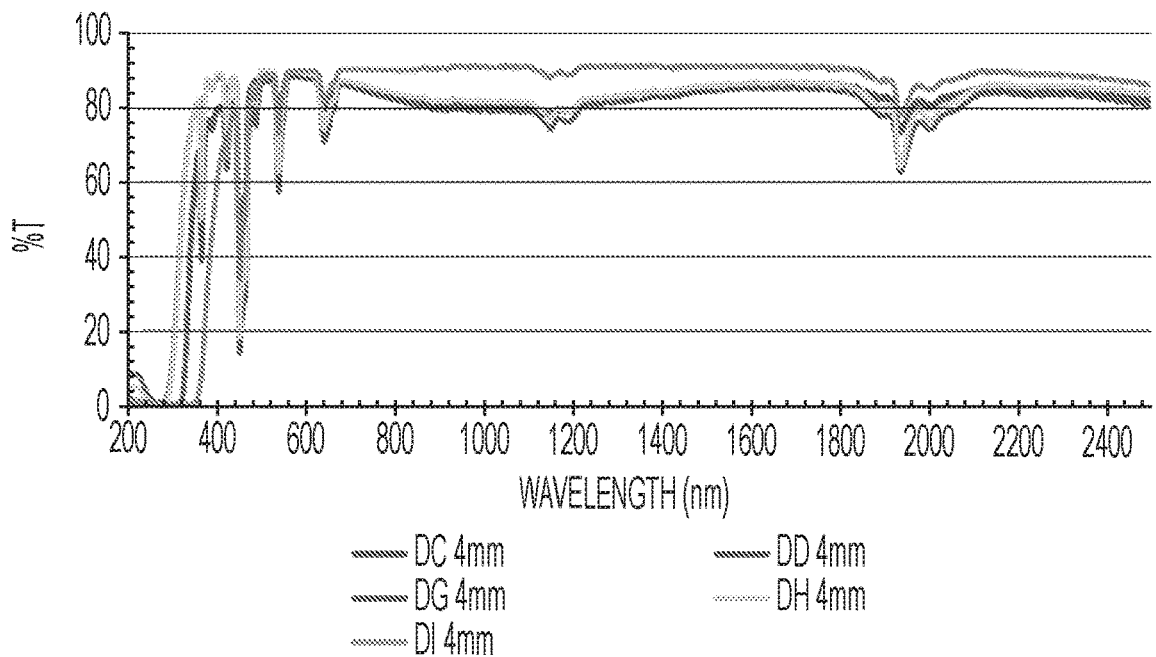
FIG. 5 shows visible and near infrared spectra for a number of example holmium-containing embodiments from Table 5.
Figure 6:
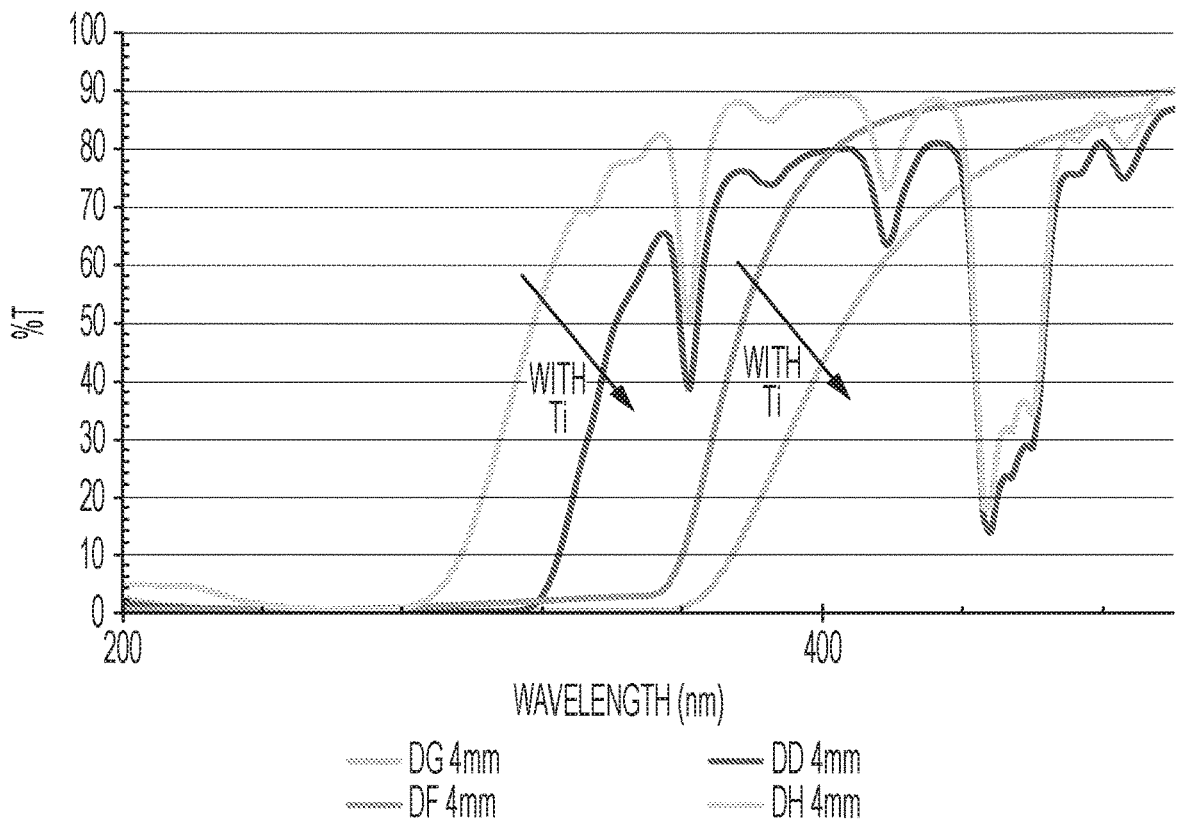
FIG. 6 a number of spectra in the UV/blue region for example embodiments from Table 6. The spectra show that for these glasses, the transmittance in the UV/blue region decreases when titanium is added to the composition.

The visible and near IR spectra for some of the embodiments are shown in FIGS. 4 and 5. The figures show that the addition of cerium oxide to the compositions provides a glass that still has high transmittance, with a cut-off in the UV/blue region similar to that shown when cerium and titanium oxides are used together. The use of holmium, both with and without titanium, shows spectra with strong absorbance bands in the visible region as well as reduced transmission through the near infrared. Of note, the presence of titanium in both holmium and cerium-containing compositions provided additional attenuation in the ultraviolet region as shown in FIG. 6. However, holmium-containing glasses both with and without titanium present show significant transmission below 400 nm (from ~90% to ~80% at 400 nm), but in the case of cerium glasses, the presence of titanium significantly reduced transmission below 400 nm (from ~80% to ~40% at 400 nm). In some colored embodiments comprising $CeO_2$ and optionally, $TiO_2$, the amount of $CeO_2$ is from 0 to 1, 0 to 0.5, 0 to 0.3, 0 to 0.2, 0 to 0.1, >0 to 0.01, >0 to 0.05, >0 to 0.1, >0 to 0.5, 0.05 to 0.3, 0.1 to 0.4, 0.1 to 0.3, or >0 to 1 mol %, the amount of $TiO_2$ is from >0 to 4, >0 to 3, >0 to 2, >0 to 1, >0 to 0.5, >0 to 0.1, 1 to 4, 1 to 3, 1 to 2, 2 to 4, 2 to 3, or 3 to 4 mol %. In some colored embodiments comprising $Ho_2O_3$, and optionally, $TiO_2$, the amount of $Ho_2O_3$ is from 0 to 1, 0 to 0.5, 0 to 0.3, 0 to 0.2, 0 to 0.1, >0 to 0.01, >0 to 0.05, >0 to 0.1, >0 to 0.5, 0.05 to 0.3, 0.1 to 0.4, 0.1 to 0.3, or >0 to 1 mol %, the amount of $TiO_2$ is from >0 to 4, >0 to 3, >0 to 2, >0 to 1, >0 to 0.5, >0 to 0.1, 1 to 4, 1 to 3, 1 to 2, 2 to 4, 2 to 3, or 3 to 4 mol %.

As noted above, the embodied glasses of one or more embodiments may exhibit a color. In some embodiments, it is desirable for the glass to have a green-yellow to gold to amber color. In particular embodiments, these colors may be combined with the blue color of a crystalline silicon photovoltaic cell to create a dark blue to black color that is aesthetically pleasing. In some embodiments, the glasses exhibit a color presented in SCE color space coordinates (determined from reflectance spectra measurements using a spectrophotometer, with illuminant D65 and specular reflectance excluded), with the following ranges: a*=from about −10 to about 30; b* =from about 0 to about 30; and L*>80 for a glass having a thickness of 2.7 mm. In some embodiments, the glasses exhibit a color presented in SCI color space coordinates of a*=from about −5 to about −1; b*=from about 5 to about 18; and L* >83 for a glass having a thickness of 2.7 mm. In some applications, the combination of the photovoltaic cell and the glass combine to produce a desired color. In such application, the SCE color space coordinates (determined from reflectance spectra measurements using a spectrophotometer, with illuminant D65 and specular reflectance excluded) of the combination of the glass and the photovoltaic cell may comprise the following ranges: a*=from about 0 to about 10; b*=from about −15 to about 0; and L* from about 10 to about 50.

Color examples of compositions both with and without a crystalline silicon photovoltaic cell are shown in Table 6. The first four columns of the table have the color coordination of a thin-line PV cell by itself and the color coordination when an embodied glass is on the top of the PV cell (thickness of the glass is 2 mm or 4 mm). The last four columns are the color coordination for the embodied glass itself.

TABLE 6

| SCE color coordination | L* | a* | b* | SCE color coordination | L* | a* | b* |
|---|---|---|---|---|---|---|---|
| PV cell thin lines | 19.09 | 8.43 | −14.12 | | | | |
| Comp. Y (2 mm w/cell) | 15.03 | 6.14 | −8.62 | Comp. Y (2 mm) | 86.76 | −2.51 | 9.14 |
| Comp. Y (4 mm w/cell) | 13.69 | 4.48 | −5.54 | Comp. Y (4 mm) | 82.63 | −4.48 | 15.11 |
| Comp. Z (2 mm w/cell) | 14.96 | 7 | −10.28 | Comp. Z (2 mm) | 88.07 | −1.72 | 6.72 |
| Comp. Z (4 mm w/cell) | 13.73 | 5.56 | −7.65 | Comp. Z (4 mm) | 84.43 | −3.32 | 12.21 |
| SCI color | L* | a* | b* | SCI color coordination | L* | a* | b* |
| PV cell thin lines | 19.25 | 7.99 | −13.28 | | | | |
| Comp. Y (2 mm w/cell) | 38.56 | 1.66 | −2.85 | Comp. Y (2 mm) | 91.89 | −2.4 | 8.72 |
| Comp. Y (4 mm w/cell) | 37.43 | 0.66 | −0.52 | Comp. Y (4 mm) | 87.81 | −4.3 | 14.47 |
| Comp. Z (2 mm w/cell) | 38.04 | 1.23 | −1.72 | Comp. Z (2 mm) | 93.2 | −1.61 | 6.31 |
| Comp. Z (4 mm w/cell) | 38.76 | 2.11 | −4 | Comp. Z (4 mm) | 89.63 | −3.19 | 11.59 |

Wherein L* indicates lightness, a* is the red/green coordinate, and b* is the yellow/blue coordinate. Deltas for L* (ΔL*), a* (Δa*) and b* (Δb*) may be positive (+) or negative (−). Specular component excluded and included (SCI) color data is provided in Table 6 for the indicated compositions. SCI is typically used to measure the "true" color of an object. This type of measurement includes both specular and diffused reflected light, making it unaffected by any surface conditions. This mode is generally ideal when formulating recipes to match colors and meet color quality standards more effectively. SCE mode is typically used to measure the appearance of an object's color. SCE excludes any specular reflected light, making it more sensitive to surface conditions. For example, a glossy object may fall in a darker, more saturated region of a defined color space and a rough-surfaced object may fall in a lighter, less saturated region of a defined color space. SCE is more often used during quality control evaluations to ensure the appearance of their products maintain consistency and meet a given standard. As can be seen from specular component excluded (SCE) color coordination in the table, all the glasses make the PV cell darker, and move the color to less red and less blue. Less blue color is more aesthetically desirable for the appearance when combined with the PV cell.

The transmission properties of the glasses in Table 6 are shown in FIG. 1. The transmittance in the visible region (390-700 nm) is above 60% for all glasses and generally over 80% at the approximate center of the visible spectrum (~550 nm). Generally, solar cells are made out of N-type and P-type semiconductor materials that use the visible and infrared light wavelengths (~350-1100 nm) to generate electricity. Therefore, the embodied glasses, both with and without color components, may be used in photovoltaic applications with limited impact on efficiency. Further, as noted above, some of the embodied glasses reduce the amount of UV light transmission, which can provide significant benefits in some applications by reducing the degradation of polymers, dyes and other materials that may be present behind or inside the device. These protective aspects are particularly advantageous in photovoltaic applications where the devices are exposed to large amount of solar radiation for extended periods of time with an expectation of a 30-year lifespan or more.

In some embodiments, the glass can be strengthened via thermal or chemical tempering. In some embodiments, the glass can be strengthened to include compressive stress (CS) that extends from a surface thereof to a depth of compression (DOC). The compressive stress regions are balanced by a central portion exhibiting a tensile stress. At the DOC, the stress crosses from a positive (compressive) stress to a negative (tensile) stress. Such strengthening methods comprise both thermal tempering and chemical tempering.

The process of thermal tempering is well known in the art. To thermally temper a glass article, the article is heated to near the softening temperature and then rapidly cooled or quenched. As a result, the glass will possess a lower surface temperature than the interior during cooling. The temperature difference is maintained until the surface of the glass cools to at least its strain point or lower, such as room temperature. Because the center of the glass cools more slowly, it contracts to a smaller specific volume while the high specific volume of the surface layer remains unchanged. This leads to a surface compressive layer that gives tempered glass its strength. The difference in specific volume is, in part, due to differences in the thermal expansion of the glass upon cooling, while to a lesser extent from a fictive temperature difference between the surface and the bulk. To a first approximation, the stress distribution in thermally tempered glass can be represented by a simple parabola, with the magnitude of the surface compressive stress approximately equal to twice the center tension.

As an alternative to thermal tempering, the glasses disclosed herein may be ion exchanged by immersion in at least one ion exchange bath containing molten salts (e.g., nitrates, sulfides, halides, or the like) of at least one alkali metal such as lithium, sodium, or potassium. Ion exchange is commonly used to chemically strengthen glasses. In one particular example, alkali cations within a source of such cations (e.g., a molten salt, or "ion exchange," bath) are exchanged with smaller alkali cations within the glass to achieve a layer under a compressive stress (CS) extending from the surface of the glass to a depth of compression (DOC) within the glass phase. For example, potassium ions from the cation source are often exchanged with sodium and/or lithium ions within the glass phase, and the $K^+$ concentration profile correlates with the compressive stress and depth of layer. The ion exchange bath may contain a salt (or salts) of a single alkali metal (e.g., sulfides, nitrates, or halides of Li, Na, or K) or salts of two or more alkali metals (e.g., sulfides, nitrates, or halides of Li and Na, or sulfides, nitrates, or halides of Na and K). Ion exchange is carried out in the ion exchange bath at temperatures ranging from about 390° C. to about 550° C. for times ranging from about 0.5 hour to about 24 hours.

The glass, in some embodiments, is ion exchanged and has a compressive layer extending from a surface to a depth of compression (DOC) of at least about 10 μm or, in some embodiments, at least about 30 μm into the glass, or in some embodiments up to about 10, 15, 20 or 25% into the glass as measured by thickness (surface to center). In some embodiments, the compressive layer extends from the surface of the glass to a depth of up to about 20% of the thickness of the glass. In some embodiments, the glass may be strengthened to exhibit a surface compressive stress in a range from 250 MPa to 800 MPa or greater.

In the strengthened glass, the depth of the compressive layer may be determined by electron microprobe, glow-discharge optical emission spectroscopy (GDOES, which is a technique for measuring depth profiles of constituent elements in a solid sample by detecting emissions from atoms accommodated in plasma by sputtering), or similar techniques that can provide composition data as a function of depth, where data would show incorporation of Na (where $Na^+$ replaces $Li^+$ in the glass phase) and/or K at the surfaces. The DOC of a precursor glass may be measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. CS may also be measured by measured by FSM. As used herein CS may be the "maximum compressive stress" which is the highest compressive stress value measured within the compressive stress layer. In some embodiments, the maximum compressive stress is located at the surface of the glass. In other embodiments, the maximum compressive stress may occur at a depth below the surface, giving the compressive profile the appearance of a "buried peak."

The thermally or chemically strengthened glasses or articles disclosed herein may be incorporated into another article such as an article with a display (or display articles) (e.g., consumer electronics, including mobile phones, tablets, computers, navigation systems, and the like), architectural articles (e.g., windows, skylights, shingles), transportation articles (e.g., automotive, trains, aircraft, sea craft, etc.), appliance articles, or any article that would benefit from transparency, scratch-resistance, abrasion resistance or a combination thereof. In other embodiments, the glass forms a portion of a consumer electronic product, such as a cellular phone or smart phone, laptop computer, tablet, or the like. Such consumer electronic products typically comprise a housing having front, back, and side surfaces, and include electrical components such as a power source, a controller, a memory, a display, and the like, which are at least partially internal to the housing. In some embodiments, the glass described herein comprises at least a portion of a protective element, such as, but not limited to, the housing and/or display of a consumer electronic product.

Processes for Making Glasses

Glasses having the oxide contents listed in Tables 1-5 can be made via traditional methods. For example, in some embodiments, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1250-1650° C. for times ranging from about 6-16 hours. The melts can thereafter be poured into steel molds to yield glass slabs. Subsequently, those slabs can be transferred immediately to an annealer operating at about 500-650° C., where the glass is held at temperature for about 1 hour and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to about 1650° C. and held at temperature for about 16 hours. The resulting glass melts are then poured onto a steel table to cool. The precursor glasses are then annealed at appropriate temperatures.

Tempering of the embodied glasses was achieved using conventional processes wherein the glasses were heated in a radiant energy furnace or a convection furnace (or a "combined mode" furnace using both techniques) to a predetermined temperature, then gas cooling ("quenching"), typically via convection by blowing large amounts of ambient air against or along the glass surface.

EXAMPLES

Embodied glasses can be made as described herein. The properties of Glaverbel soda lime glass (SLG) are compared to the properties of the embodied glasses. As noted above, the properties of embodied glasses are shown in Tables 1-5. In addition, Table 7 compares the surface compression of composition C to Glaverbel SLG for 1 mm and 2.7 mm thick glass slabs. Composition C shows a temperability value of 0.99, approximately 32% higher than SLG and is capable of obtaining a surface compression of 145 MPa vs 105 MPa for SLG at 1 mm and 135 MPa vs 96 MPa for SLG at 2.7 mm under equivalent tempering conditions, showing that the temperability value correlates with the toughness of the glass.

TABLE 7

| Glass | Ψ | H (cal/(cm$^2$-s-K)) | T$_0$ [° C.] | Thickness [mm] | Surface Compression [MPa] |
|---|---|---|---|---|---|
| Glaverbel | 0.75 | 0.039 | 690 | 1.05 | 105 |
| Glaverbel | 0.75 | 0.001 | 670 | 2.70 | 96 |
| Comp. C | 0.99 | 0.039 | 680 | 1.03 | 145 |
| Comp. C | 0.99 | 0.001 | 660 | 2.70 | 135 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass composition comprising:
   55-75 mol % $SiO_2$;
   5-10 mol % $Al_2O_3$;
   3-10 mol % MgO;
   5-15 mol % CaO;
   8-15 mol % $Na_2O+K_2O$;
   0-15 mol % $Na_2O$;
   0-15 mol % $K_2O$;
   >1-4 mol % $TiO_2$;
   1.5-6 mol % $B_2O_3$; and
   >0-2 mol % $CeO_2$, $Ho_2O_3$, CuO, NiO, or combinations thereof.

2. The glass composition of claim 1, wherein the glass composition has a low temperature coefficient of thermal expansion (LTCTE) measured from 25° C. to 300° C. and a high temperature coefficient of thermal expansion (HTCTE) measured at temperature above glass transition region, and wherein the sum of the LTCTE and the HTCTE is $350\times10^{-7}$/° C. or greater.

3. The glass composition of claim 1, wherein the glass composition has a temperability, $\psi$, and the temperability, $\psi$, is equal to or greater than 0.80.

4. The glass composition of claim 1, wherein the glass composition exhibits a color presented in SCE color space coordinates with the following values:
   $a^*$=from about −10 to about 30;
   $b^*$=from about 0 to about 30; and
   $L^*$>83.

5. The glass composition of claim 2, wherein sum of the LTCTE and the HTCTE is $400\times10^{-7}$/° C. or greater.

6. The glass composition of claim 3, wherein the temperability, is equal to or greater than 0.90.

* * * * *

UNITED STATES PATENT AND TRADEMARK OFFICE
CERTIFICATE OF CORRECTION

PATENT NO. : 11,492,286 B2  
APPLICATION NO. : 16/767170  
DATED : November 8, 2022  
INVENTOR(S) : Timothy James Kiczenski et al.

Page 1 of 1

It is certified that error appears in the above-identified patent and that said Letters Patent is hereby corrected as shown below:

On the Title Page

Page 2, in Column 2, item [56], Line 8, Delete "SiO21"," and insert -- SiO2", --.

Signed and Sealed this
Twenty-fifth Day of July, 2023

Katherine Kelly Vidal
*Director of the United States Patent and Trademark Office*